United States Patent
Choi et al.

(10) Patent No.: US 9,749,858 B2
(45) Date of Patent: Aug. 29, 2017

(54) MOBILE TERMINAL, MOBILE TERMINAL AUXILIARY DEVICE AND METHOD FOR CONTROLLING THE SAME

(71) Applicant: Samsung Electronics Co., Ltd., Gyeonggi-do (KR)

(72) Inventors: Hyun Chul Choi, Seoul (KR); Hyuk Kang, Gyeonggi-do (KR); Hyeong Seok Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 155 days.

(21) Appl. No.: 14/509,670

(22) Filed: Oct. 8, 2014

(65) Prior Publication Data
US 2015/0099486 A1 Apr. 9, 2015

(30) Foreign Application Priority Data
Oct. 8, 2013 (KR) .................. 10-2013-0119737

(51) Int. Cl.
| | |
|---|---|
| *H04M 1/66* | (2006.01) |
| *H04W 12/06* | (2009.01) |
| *H04W 4/02* | (2009.01) |
| *H04M 1/67* | (2006.01) |
| *H04M 1/725* | (2006.01) |
| *H04L 29/06* | (2006.01) |

(52) U.S. Cl.
CPC ............ *H04W 12/06* (2013.01); *H04M 1/67* (2013.01); *H04M 1/7253* (2013.01); *H04W 4/02* (2013.01); *H04L 63/0492* (2013.01); *H04M 2250/22* (2013.01)

(58) Field of Classification Search
USPC .................. 455/411, 412, 41.2; 370/338
See application file for complete search history.

(56) References Cited

U.S. PATENT DOCUMENTS

| | | | | |
|---|---|---|---|---|
| 9,154,954 | B2* | 10/2015 | Tamai | H04M 1/67 |
| 9,179,310 | B2* | 11/2015 | Kawabata | G06F 3/04883 |
| 9,398,133 | B2* | 7/2016 | Jo | H04M 1/67 |
| 2002/0111138 | A1* | 8/2002 | Park | H04M 1/7253 |
| | | | | 455/41.2 |
| 2008/0287062 | A1* | 11/2008 | Claus | H04W 12/02 |
| | | | | 455/41.2 |
| 2011/0173447 | A1* | 7/2011 | Zhang | H04B 3/542 |
| | | | | 713/168 |
| 2012/0139879 | A1 | 6/2012 | Kim et al. | |
| 2012/0206555 | A1* | 8/2012 | Yoshida | B60R 11/0241 |
| | | | | 348/14.02 |

(Continued)

*Primary Examiner* — David Q Nguyen
(74) *Attorney, Agent, or Firm* — The Farrell Law Firm, P.C.

(57) ABSTRACT

Methods and apparatuses are provided for controlling a mobile terminal and a mobile terminal auxiliary device. Information on at least one of the mobile terminal and the mobile terminal auxiliary device and security-related information on the at least one of the mobile terminal and the mobile terminal auxiliary device are stored. It is determined whether the mobile terminal and the mobile terminal auxiliary device exist within a predetermined available distance. If the mobile terminal and the mobile terminal auxiliary device exist within the predetermined available distance, it is determined whether the mobile terminal or the mobile terminal auxiliary device has been registered by using the stored information.

20 Claims, 19 Drawing Sheets

(56) References Cited

U.S. PATENT DOCUMENTS

| | | | | |
|---|---|---|---|---|
| 2012/0258665 A1* | 10/2012 | Sip | .................. | H04W 84/18 |
| | | | | 455/41.2 |
| 2012/0281686 A1* | 11/2012 | Pollari | .................. | G06Q 30/02 |
| | | | | 370/338 |
| 2012/0322376 A1* | 12/2012 | Couse | .................. | H04M 1/7253 |
| | | | | 455/41.2 |
| 2013/0143499 A1* | 6/2013 | Ando | .................. | H04W 4/021 |
| | | | | 455/41.2 |
| 2013/0257777 A1* | 10/2013 | Benko | .................. | G06F 3/03545 |
| | | | | 345/173 |
| 2014/0115690 A1* | 4/2014 | Huang | .................. | G06F 3/0488 |
| | | | | 726/16 |
| 2014/0298672 A1* | 10/2014 | Straker | .................. | H04W 12/06 |
| | | | | 34/175 |
| 2014/0378056 A1* | 12/2014 | Liu | .................. | H04W 4/008 |
| | | | | 455/41.2 |

* cited by examiner

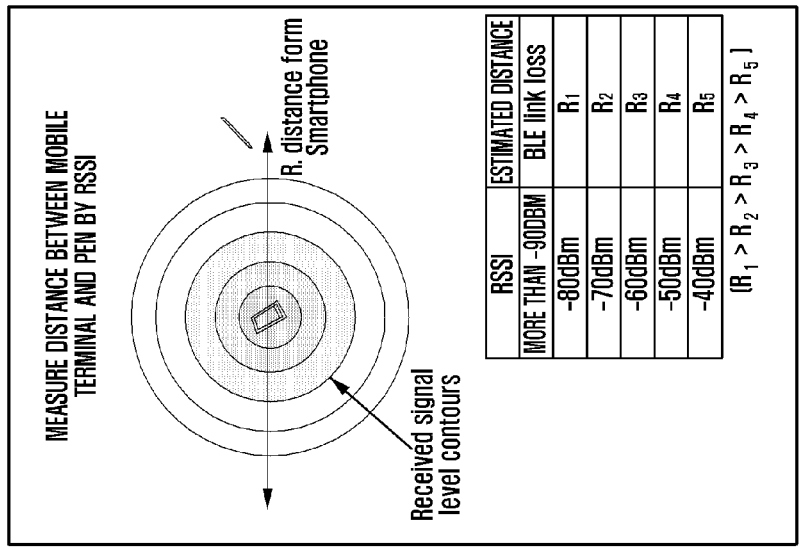
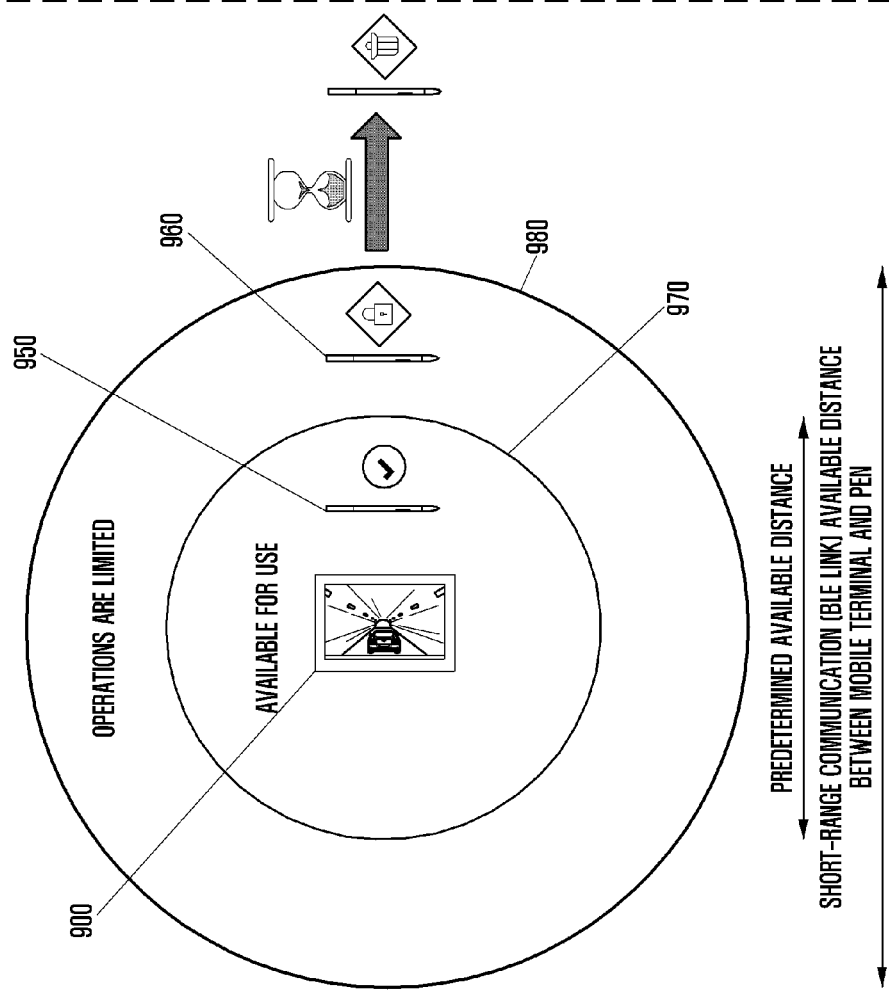

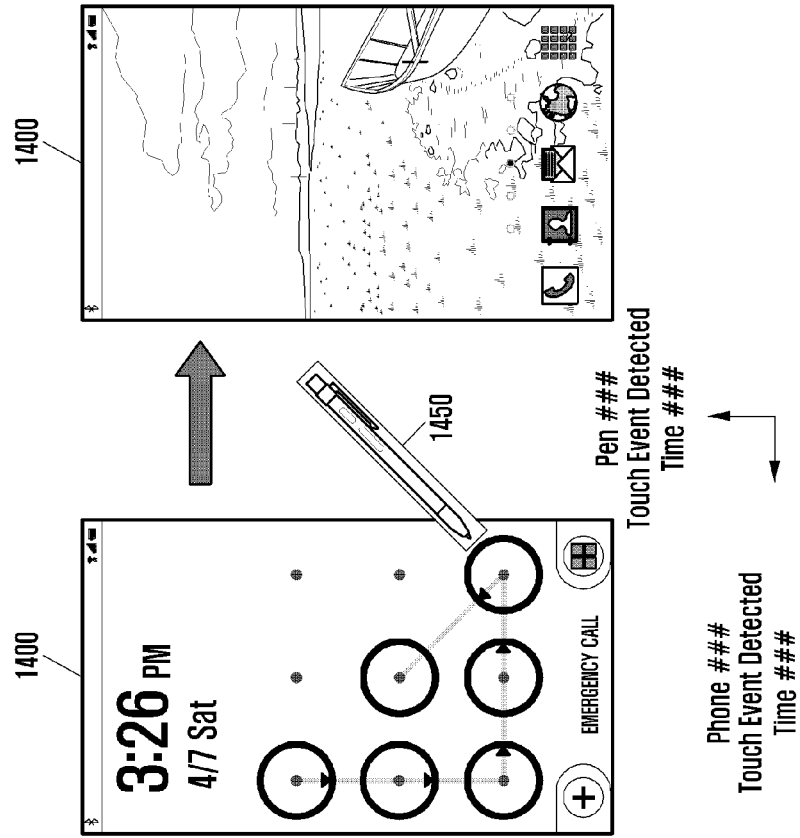
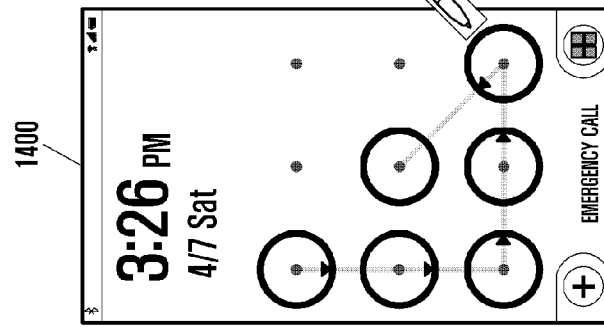
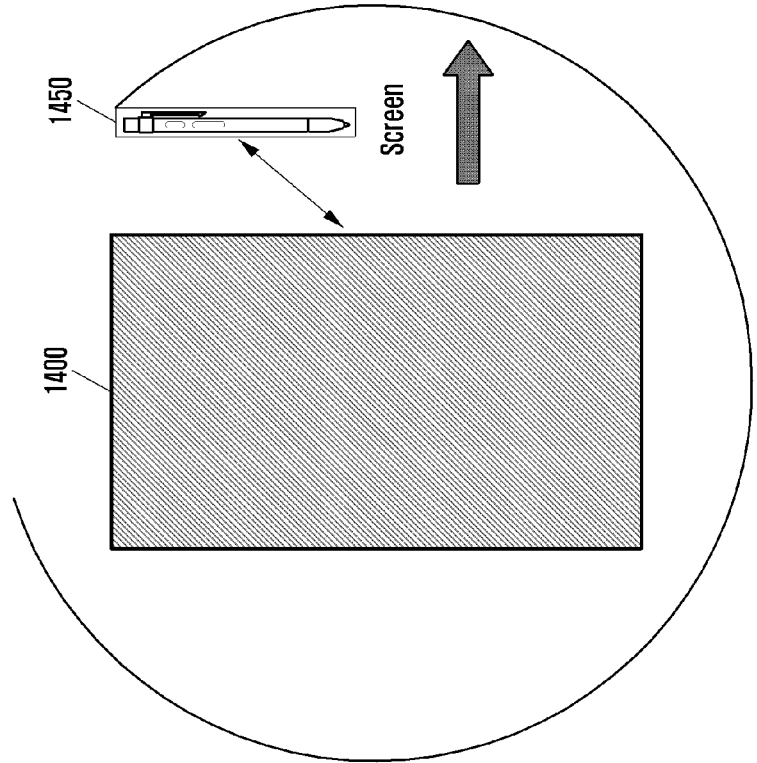

MOBILE TERMINAL, MOBILE TERMINAL AUXILIARY DEVICE AND METHOD FOR CONTROLLING THE SAME

PRIORITY

This application claims priority under 35 U.S.C. §119(a) to Korean Patent Application No. 10-2013-0119737, filed on Oct. 8, 2013, the content of which is incorporated herein by reference.

BACKGROUND OF THE INVENTION

1. Field of the Invention

The present invention relates generally to a mobile terminal and a mobile terminal auxiliary device, and more particularly, to a control method by which security related functions of the mobile terminal can be executed without an additional authentication process by registration between the mobile terminal and the mobile terminal auxiliary device.

2. Description of the Related Art

Terminals are classified into mobile/portable terminals and stationary terminals according to their mobility. Mobile terminals are divided into handheld terminals and vehicle mount terminals according to whether a user can carry the terminals.

Terminals have been implemented with multimedia players that have multiple functions such as, for example, photographing still images or moving images, reproducing music files or movie files, playing games, receiving broadcasts, or the like.

In order to support and strengthen the functions of the terminals, structures and/or software of the terminals can be improved.

In addition, various terminal auxiliary devices have been used for convenient use of the terminals. Particularly, electronic pens, such as styluses, may be used as terminal auxiliary devices.

The terminal and the pen are connected with each other wirelessly or using a wire, and the terminal receives a user input by using the pen. Therefore, the user can input specific texts, symbols, images, or the like more easily, accurately and faster.

Pens are widely used in the terminals as accessories. Further, with the improvement of technology, the pens can transfer more precise illustrations and designs of a user to electronic devices.

FIGS. 1A and 1B are diagrams illustrating manipulation of a mobile terminal by using a mobile terminal auxiliary device.

As shown in FIG. 1A, when a user touches specific contents such as, for example, a memo, a schedule, an email, or a diary, which are displayed in a display unit of a mobile terminal 100, by using a mobile terminal auxiliary device, such as, for example, an electronic pen 150, an operation of pre-viewing the corresponding contents may be executed. The touch of the electronic pen 150 may be performed by a proximity touch and/or a contact touch.

In addition, as shown in FIG. 1B, when the mobile terminal auxiliary device, for example, the electronic pen 150, which is connected with the mobile terminal, is taken out from the mobile terminal while a screen 110 of the mobile terminal is turned off, the mobile terminal may be configured to automatically switch to a locked image 120. Here, the locked image means an image followed by a waiting image in which the mobile terminal can be used. That is, the mobile terminal may wait for instructions for releasing security, such as a password input of a user. When the user inputs the instruction for releasing security, the locked state of the mobile terminal may be released, and the mobile terminal may switch to the waiting image to thereby execute operations thereof.

FIGS. 2A and 2B are diagrams illustrating manipulation of a mobile terminal by using a mobile terminal auxiliary device.

Referring to FIG. 2A, in contents 210 such as, for example, a memo, when other people's accesses are restricted through a locking setup by a user, a preview function by the mobile terminal auxiliary device 150 of FIG. 1A may be deactivated. That is, in the case of a memo that is set to be locked, although someone touches the corresponding contents by the mobile terminal auxiliary device, the preview function may not be executed unless the password is entered by the user.

In addition, as shown in FIG. 2B, although a locked image 230 is displayed by taking out the mobile terminal auxiliary device from the mobile terminal while a screen 220 of the mobile terminal is turned off, the terminal may be switched to an available state, i.e., the waiting state, only by inputting the instruction for releasing security, such as by entering the password by the user.

Further, although not shown in the drawings, even while using the mobile terminal by the mobile terminal auxiliary device, for example, the electronic pen, if the mobile terminal does not continuously receive usage instruction inputs, i.e., the touch signal inputs, the screen of the mobile terminal will be turned off soon and the security function will be resumed.

Furthermore, even though the user obtains the authority to access the contents or releases the locked state of the mobile terminal through the security process, if the mobile terminal is not used for a while or it is required to be turned off and then turned on, the user is required to repeat the security process.

SUMMARY OF THE INVENTION

The present invention has been made to address at least the above problems and/or disadvantages and to provide at least the advantages described below. Accordingly, an aspect of the present invention provides a mobile terminal auxiliary device that may be authenticated through a security process when it is connected with a mobile terminal, so that repetition of the security process may be removed when the mobile terminal auxiliary device is required to be used afterwards, to thereby enhance the usability of the mobile terminal.

Another aspect of the present invention provides convenience in using applications, which can be used only by the process of logging on or releasing a locked state by means of a mobile terminal auxiliary device.

An additional aspect of the present invention prevents a screen of a mobile terminal from being turned off or a locked state from being resumed during the use of the mobile terminal, by continuously checking the use of the mobile terminal using a low power technology without an additional operation of a mobile terminal auxiliary device.

A further aspect of the present invention allows, when a user wishes to use each of a plurality of mobile terminals, or authentication is required, the user to control each mobile terminal by the authenticated mobile terminal auxiliary device and use the mobile terminal without the security checking process to thereby provide convenient use thereof.

Another aspect of the present invention allows each mobile terminal to identify the user through the corresponding mobile terminal auxiliary device, and a UI of the mobile terminal to be configured with specific values predefined according to the setup or user's desire.

In accordance with an aspect of the present invention, a method is provided for controlling a mobile terminal auxiliary device. Information on at least one mobile terminal and security-related information on each of the at least one mobile terminal are stored. It is determined whether a mobile terminal exists within a predetermined available distance from the mobile terminal auxiliary device. If the mobile terminal exists within the predetermined available distance, it is determined whether the mobile terminal has been registered by using the stored information on the at least one mobile terminal. If the mobile terminal has been registered, security-related information on the mobile terminal from the stored security-related information on each of the at least one mobile terminal, is transmitted to the mobile terminal.

In accordance with another aspect of the present invention, a method is provided for controlling a mobile terminal. Information on at least one mobile terminal auxiliary device is stored. It is determined whether a mobile terminal auxiliary device exists within a predetermined available distance from the mobile terminal. If the mobile terminal auxiliary device exists within the predetermined available distance, it is determined whether the mobile terminal auxiliary device has been registered by using the information on the at least one mobile terminal auxiliary device. If the mobile terminal auxiliary device has been registered, predetermined security-related information is applied according to the mobile terminal auxiliary device.

In accordance with another aspect of the present invention, a mobile terminal auxiliary device is provided that includes a communication unit that communicates with at least one mobile terminal, and a memory that stores information on the at least one mobile terminal and security-related information on each of the at least one mobile terminal. The mobile terminal auxiliary device also includes a controller that determines whether the mobile terminal exists within a predetermined available distance from the mobile terminal auxiliary device, determines whether the mobile terminal has been registered by using the stored information on at least one mobile terminal if the mobile terminal exists within the predetermined available distance, and controls the communication unit to transmit security-related information on the mobile terminal from the stored security-related information on each of the at least one mobile terminal, to the mobile terminal, if the mobile terminal has been registered.

In accordance with another aspect of the present invention, a mobile terminal is provided that includes a communication unit that communicates with at least one mobile terminal auxiliary device, and a memory that stores information on the at least one mobile terminal auxiliary device. The mobile terminal also includes a controller that determines whether a mobile terminal auxiliary device exists within a predetermined available distance from the mobile terminal, determines whether the mobile terminal auxiliary device has been registered by using the information on the at least one mobile terminal auxiliary device if the mobile terminal auxiliary device exists within the predetermined available distance, and controls to apply predetermined security-related information according to the mobile terminal auxiliary device if the mobile terminal auxiliary device has been registered.

BRIEF DESCRIPTION OF THE DRAWINGS

The above and other aspects, features, and advantages of the present invention will be more apparent from the following detailed description when taken in conjunction with the accompanying drawings, in which:

FIGS. 9A and 9B are diagrams illustrating an available distance, according to an embodiment of the present invention;

FIGS. 14A-14C are diagrams illustrating a determination of whether a mobile terminal auxiliary device has been used, according to an embodiment of the present invention;

DETAILED DESCRIPTION OF EMBODIMENTS OF THE PRESENT INVENTION

Figure 1A:
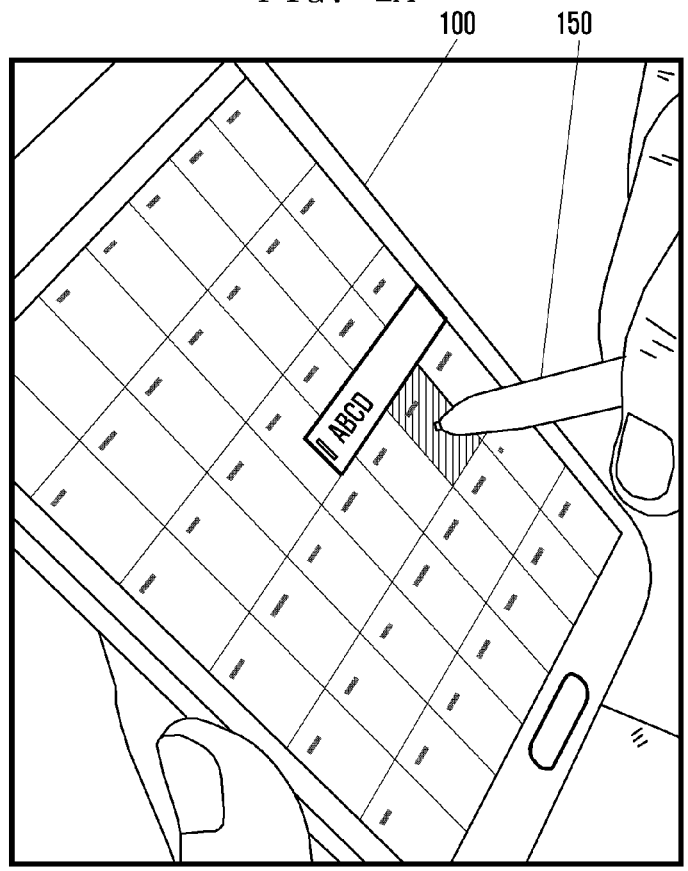
FIGS. 1A and 1B are diagrams illustrating manipulation of a mobile terminal by using a mobile terminal auxiliary device.
Figure 1B:
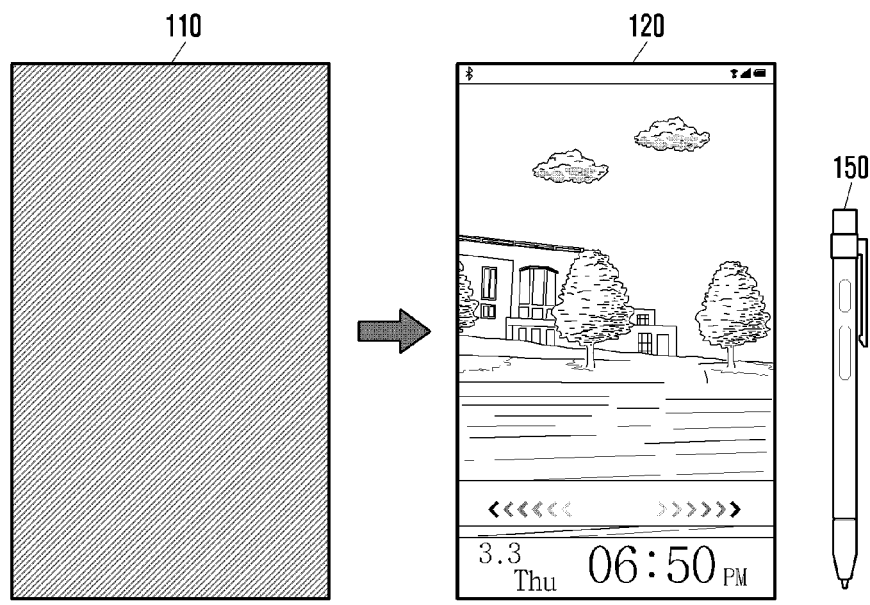
Figure 2A:
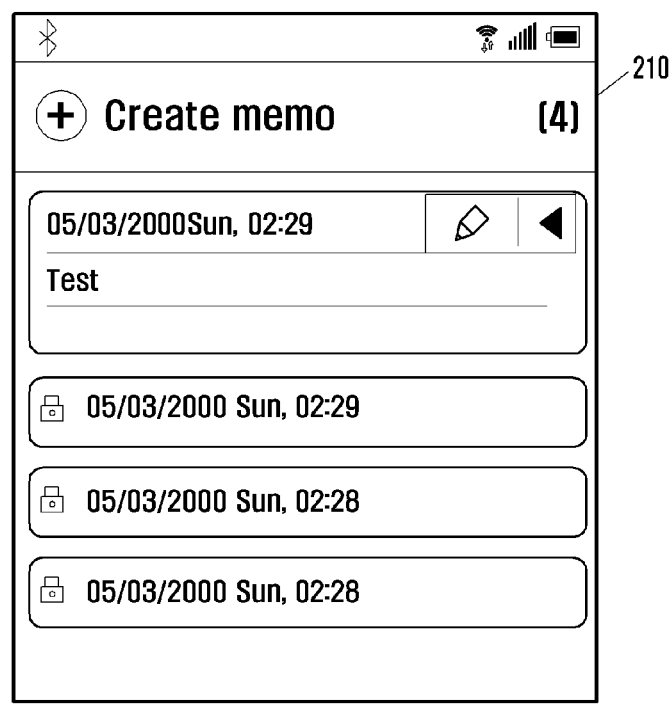
FIGS. 2A and 2B are diagrams illustrating manipulation of a mobile terminal by using a mobile terminal auxiliary device.
Figure 2B:
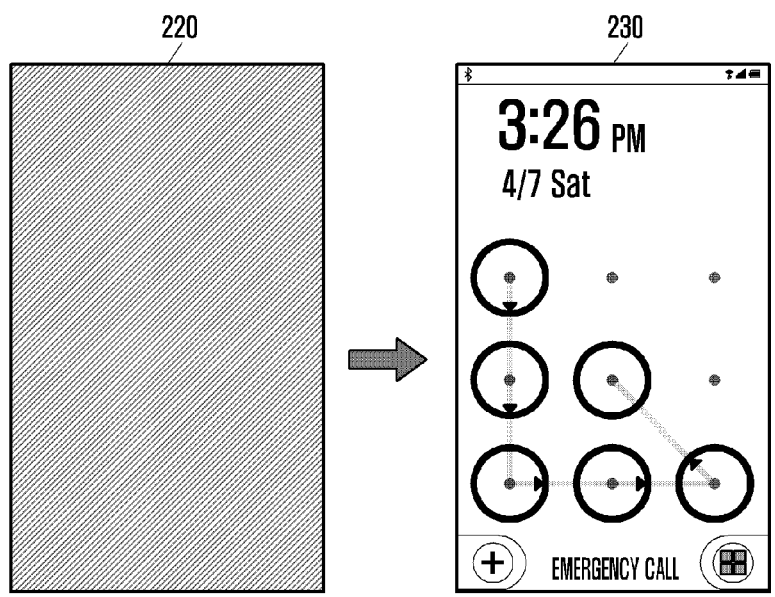

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Hereinafter, a mobile terminal associated with the present invention will be described in detail with reference to drawings. The suffixes of component elements used in the following descriptions, such as, a "module" and a "unit", are assigned or used together only for ease of description, but they do not have distinguishing meanings or roles.

A mobile terminal described in the embodiments of the present invention may be embodied as a portable phone, a smart phone, a laptop computer, a digital broadcasting terminal, a personal digital assistant (PDA), a portable multimedia player (PMP), a navigation terminal, and the like. However, it is apparent to those skilled in the art that a configuration according to embodiments of the present invention are also applied to a stationary terminal such as, for example, a digital TV, a desktop computer, and the like.

Mobile terminal auxiliary devices of the embodiments of the present invention may include electronic pens, such as styluses, which can communicate with a mobile terminal. In addition, it is obvious for those skilled in the art that the mobile terminal auxiliary devices of the present invention may be applied to stationary terminals such as TVs, desktop computers, or the like, as well as the mobile terminals.

Figure 3:
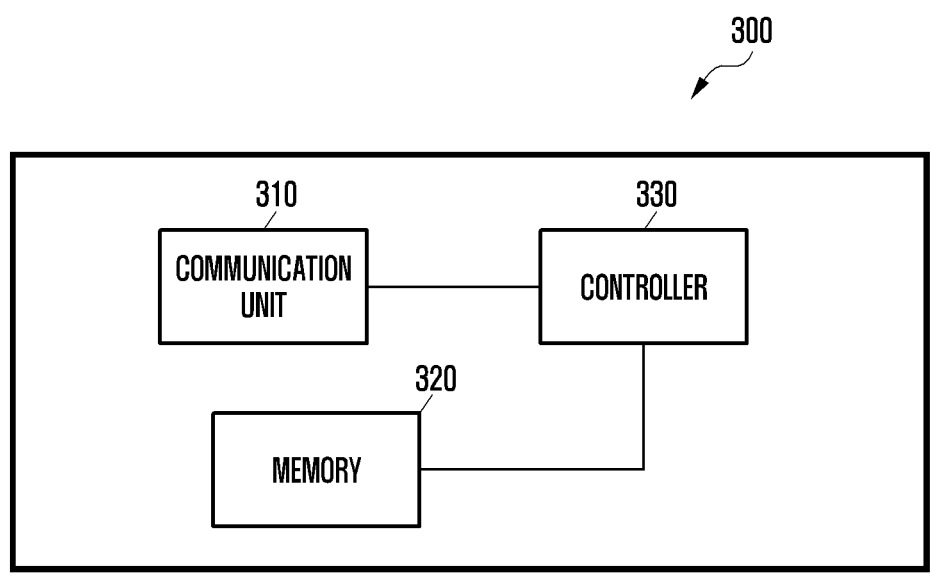
FIG. 3 is a block diagram illustrating a mobile terminal auxiliary device, according to an embodiment of the present invention.

FIG. 3 is a block diagram illustrating a mobile terminal auxiliary device, according to an embodiment of the present invention.

A mobile terminal auxiliary device 300 includes a communication unit 310, a memory 320, and a controller 330. The mobile terminal auxiliary device is not limited to the elements of FIG. 3, and it may further include other elements, or some of the elements may be omitted. For example, the mobile terminal auxiliary device 300 may further include an output unit, such as, for example, an audio output module, an alarm unit, and a display unit, and a user input unit for receiving a user input.

The communication unit 310 may include at least one module enabling wireless communication between the mobile terminal auxiliary device 300 and a mobile terminal. For example, the communication unit 310 may include a short-range communication module for near field communication. Here, the short-range communication technology may adopt Bluetooth, radio frequency identification (RFID), infrared data association (IrDA), ultra wideband (UWB), ZigBee, or the like. According to an embodiment of the present invention, the short-range communication module may be at least one of a Bluetooth (BT) module and a Bluetooth low energy (BLE) module.

The communication unit 310 may allow the mobile terminal auxiliary device 300 and the mobile terminal to register with each other by communicating with the mobile terminal, as described in greater detail below.

The memory 320 may store programs for processing and controlling of the controller 330 and perform a function of temporarily storing input/output data (e.g., information on the mobile terminal, identification information on the mobile terminal, identification information on the mobile terminal auxiliary device, security related information, or the like). The memory 320 may store frequency of use for the data.

The memory 320 may include at least one storage medium of a flash memory type, a hard disk type, a multimedia card micro type, a card type memory (e.g., a secure digital (SD) memory, an XD memory, or the like), a random access memory (RAM), a static RAM (SRAM), a read-only memory (ROM), an electrically erasable programmable ROM (EEPROM), a programmable ROM (PROM), a magnetic memory, a magnetic disk, and an optical disk. The mobile terminal auxiliary device 300 may operate in relation to a web storage for providing a storage function of the memory 320 on the Internet.

In general, the controller 330 controls overall operations of the mobile terminal auxiliary device 300. For example, the controller 330 may control to perform an operation of registering the mobile terminal auxiliary device 300 and the mobile terminal with each other. In addition, in the case of using the mobile terminal auxiliary device 300 through authentication between the mobile terminal and the mobile terminal auxiliary device 300, the controller 330 may control to use the mobile terminal without an additional security checking process, which is described in greater detail below.

The mobile terminal auxiliary device 300 may further include a user input unit. The user input unit generates input data for controlling operations of the mobile terminal auxiliary device by a user. The user input unit may include at least one of buttons provided on the front, back, or side surface of the mobile terminal auxiliary device, touch sensors (a pressure type/a capacitive type), keypads, dome switches, jog wheels, jog switches, or the like, but it is not limited thereto.

Figure 4:
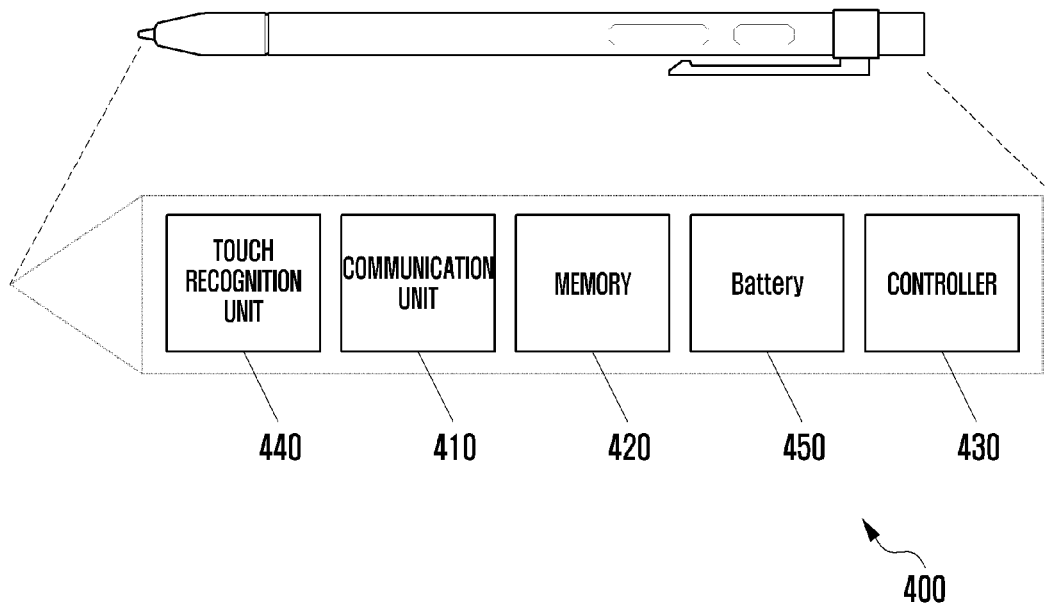
FIG. 4 is a block diagram illustrating an electronic pen, according to an embodiment of the present invention.

FIG. 4 is a block diagram illustrating an electronic pen, according to an embodiment of the present invention.

The mobile terminal auxiliary device, according to an embodiment of the present invention, may be embodied as an electronic pen 400, such as a stylus. The electronic pen 400 includes a communication unit 410, a memory 420, a controller 430, a touch recognition unit 440, and the like, but it is not limited thereto. For example, the electronic pen 400 may further include a power supply, such as a battery 450, and the power supply may receive external power and internal power to be supplied to each element to operate under the control of the controller 430. The power supply may include at least one of connection ports, a power supply controller, and a charge monitoring unit, as well as the battery 450.

The communication unit 410 may include at least one module enabling wireless communication between the electronic pen 400 and a mobile terminal. According to an embodiment of the present invention, the communication unit 410 may include at least one of a BT module or a BLE module.

The communication unit 410 may allow the electronic pen 400 and the mobile terminal to be registered with respect to each other by communicating with the mobile terminal, as described in greater detail below.

The memory 420 may store programs for processing and controlling of the controller 430 and perform a function of temporarily storing input/output data (e.g., information on the mobile terminal, identification information on the mobile terminal, identification information on the mobile terminal auxiliary device, security related information, or the like), as described in detail above.

In general, the controller 430 controls overall operations of the electronic pen 400. For example, the controller 430 may control to perform an operation of registering the electronic pen 400 and the mobile terminal with each other. In addition, in the case of using the electronic pen 400 through authentication between the mobile terminal and the electronic pen 400, the controller 430 may control to use the mobile terminal without an additional security checking process, as described in detail below.

The touch recognition unit 440 may recognize touch signals of the electronic pen 400. When the touch signal of the electronic pen 400 is input, the controller 430 controls to perform a predetermined operation according to the touch signal input. According to an embodiment of the present invention, in addition to the touch recognition unit 440, the electronic pen 400 may further include a user input unit for generating input data of a user. The user input unit may include at least one of buttons provided on the side surface of the electronic pen, a keypad, a dome switch, a jog wheel, a jog switch, or the like, but it is not limited thereto.

Figure 5:
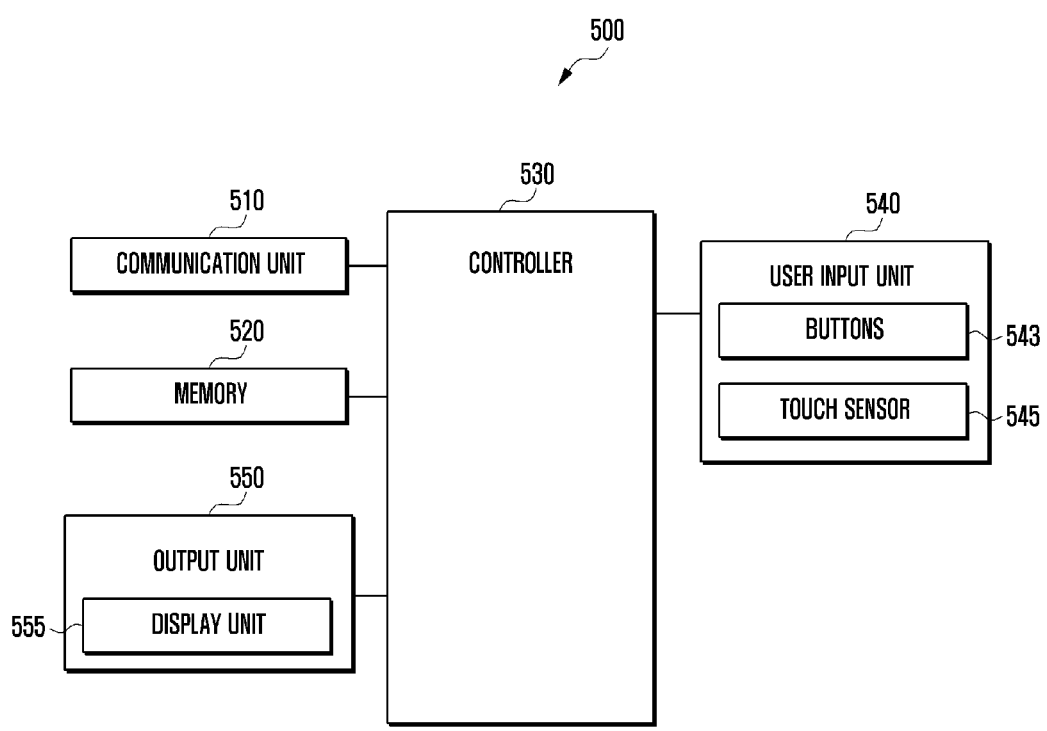
FIG. 5 is a block diagram illustrating a mobile terminal, according to an embodiment of the present invention.

FIG. 5 is a block diagram illustrating a mobile terminal, according to an embodiment of the present invention.

A mobile terminal 500 includes a communication unit 510, a memory 520, a controller 530, a user input unit 540, and an output unit 550. The elements shown in FIG. 5 are not essential to the mobile terminal, and the mobile terminal may further include other elements, or some of the elements may be omitted.

The communication unit 510 may include at least one module enabling wireless communication between the mobile terminal 500 and a wireless communication system, or the mobile terminal 500 and a network where the mobile terminal 500 is located. In addition, the communication unit 510 may include at least one module enabling wireless communication between the mobile terminal 500 and the mobile terminal auxiliary device. For example, the communication unit 510 may include a broadcast receiving module, a mobile communication module, a wireless Internet module, a short-range communication module, a location information module, and the like.

The broadcast receiving module receives broadcast signals and/or broadcast-related information from external broadcast management servers through broadcasting channels. The broadcasting channels may include a satellite channel and a ground wave channel. At least two broadcast receiving modules may be provided in the mobile terminal 500 to concurrently receive broadcasts through at least two broadcasting channels or to switch between at least two broadcasting channels.

The mobile communication module transmits and receives wireless signals to and from at least one of base stations, other terminals, and servers in mobile communication networks, such as, for example, global system for mobile communication (GSM), code division multiple access (CDMA), wideband CDMA (WCDMA) (but not limited thereto). The wireless signals may include voice call signals, video call signals, or various data according to transmission and reception of text/multimedia messages.

The wireless Internet module for connecting the wireless Internet may be built in the mobile terminal 500 or externally provided. The wireless Internet may utilize the technologies of wireless LAN (WLAN), Wi-Fi, wireless broadband (Wibro), world interoperability for microwave access (Wimax), high speed downlink packet access (HSDPA), GSM, CDMA, WCDMA, long term evolution (LTE), or the like.

The wireless Internet connection through Wibro, HSDPA, GSM, CDMA, WCDMA, and LTE is made by wireless mobile communication networks. Accordingly, the wireless Internet module that connects with the wireless Internet through the mobile communication networks may be regarded as a type of mobile communication module.

The short-range communication module refers to a module for near field communication. The short-range communication technology may adopt BT, RFID, IrDA, UWB, ZigBee, or the like. According to an embodiment of the present invention, the short-range communication module may be at least one of a BT module and a BLE module.

The user input unit 540 generates input data for controlling operations of the mobile terminal by a user. The user input unit 540 may include buttons 543 on the front, back or side surface of the mobile terminal 500, and a touch sensor (a pressure type/a capacitive type) 545. The user input unit 540 may further include keypads, dome switches, jog wheels, jog switches, or the like.

The output unit 550 may generate outputs related to a sense of sight, a sense of hearing, or a sense of touch, and includes a display unit 555, but it is not limited thereto. For example, the output unit 550 may include an audio output module, an alarm module, and a haptic module.

The display unit 555 displays (outputs) information processed in the mobile terminal 500. For example, when the mobile terminal 500 is in a phone call mode, the display unit 555 displays a user interface (UI) or a graphic user interface (GUI) related to the phone call. When the mobile terminal 500 is in a video call mode or photographing mode, the display unit 555 displays images, which are photographed and/or received, using the UI or the GUI.

The display unit 555 may include at least one of a liquid crystal display (LCD), a thin film transistor-LCD (TFT LCD), an organic light-emitting diode (OLED), a flexible display, and a 3D display.

Some of the above displays may be configured to be transparent or light-penetrable in order to view the outside therethrough, which are called transparent displays, typically, including transparent OLEDs (TOLEDs). The back structure of the display unit 555 may be also configured to be light-penetrable. According to the above structure, a user can see objects behind the terminal through the area of the display unit 555 of the terminal.

Two or more display units 555 may be provided according to the type of mobile terminal 500. For example, a plurality of display units may be arranged to be spaced from each other or to be integral on the same plane, or may be disposed on different planes in the mobile terminal 500.

In the case of the display unit 555 and the touch sensor 545, which are formed in a layer structure or integrally (hereinafter, referred to as a "touch screen"), the display unit 555 may be used as the input device as well as the output device. The touch sensor may be formed to be a laminate with the display unit 555 in the case of, for example, touch films, touch sheets, touch pads, or the like, or may be integrally formed with the display unit 555.

The touch sensor may be configured to convert the change of pressure acting on the specific portion of the display unit 555 or the change of capacitance generating on the specific portion of the display unit 555 to electric signals. The touch sensor may be configured to detect the touch pressure as well as the touch point and the touch area.

Upon a touch input on the touch sensor, the corresponding signals are transmitted to a touch controller. The touch controller processes the signals and transmits the corresponding data to the controller 530. Accordingly, the controller 530 may recognize which area of the display unit 555 has been touched.

Although not shown in the drawing, a proximity sensor may be disposed inside or around the touch screen of the mobile terminal 500. The proximity sensor may detect objects approaching a predetermined detection surface, or objects around the proximity sensor, by using an electromagnetic field force or an infrared ray without mechanical contacts. The proximity sensor has a long life span and various utilization compared to a contact type sensor.

The proximity sensor may include a transparent photoelectric sensor, a direct reflection photoelectric sensor, a mirror reflection photoelectric sensor, a high frequency oscillating proximity sensor, a capacitive proximity sensor, a magnetic proximity sensor an infrared proximity sensor, or the like.

Hereinafter, for convenience of explanation, the term "proximity touch" may refer to an operation in which a pointer approaches the touch screen where the proximity sensor is installed to be thereby recognized without a contact, and the term "contact touch" may refer to an operation of touching of the pointer on the screen. A proximity touch point of the pointer on the touch screen may denote the point on the screen which vertically corresponds to the location of the pointer in the state of the proximity touch. Hereinafter, the term "touch" may encompass the proximity touch as well as the contact touch.

According to an embodiment of the present invention, the proximity touch may include a hovering input.

The proximity sensor detects the proximity touch and a proximity touch pattern (e.g., a proximity touch distance, a proximity touch direction, a proximity touch speed, a proximity touch time, a proximity touch point, a proximity touch movement state, or the like). Information corresponding to the detected proximity touch and the proximity touch pattern may be displayed on the touch screen.

The memory 520 may store programs for processing and controlling of the controller 530 and perform a function of temporarily storing input/output data (e.g., a telephone number list, messages, audio, still images, moving images, information on the mobile terminal, identification information on the mobile terminal, information on the mobile terminal auxiliary device, security related information, or the like). The memory 520 may store frequency of use for the data.

In addition, the memory 520 may store data on various vibrations and sounds, which are output upon the touch input on the touch screen.

The memory 520 may include at least one storage medium of a flash memory type, a hard disk type, a multimedia card micro type, a card type memory (e.g., an SD memory, an XD memory, or the like), a RAM, an SRAM, a ROM, an EEPROM, a PROM, a magnetic memory, a magnetic disk, and an optical disk. The mobile terminal 500 may operate in relation to a web storage for providing a storage function of the memory 520 on the Internet.

The mobile terminal 500 may further include an audio/video (A/V) input unit for inputting audio signals or video signals, and a sensing unit for generating sensing signals to sense the current state of the mobile terminal 500, such as, for example, the opening/closing state of the mobile terminal 500, the location of the mobile terminal 500, contact of users, directions of the mobile terminal, and acceleration/deceleration of the mobile terminal, and to thereby control operations of the mobile terminal 500.

In addition, the mobile terminal 500 may include an interface unit that plays a role of a path for all external devices connected with the mobile terminal 500. The interface unit receives data or power from the external devices and transfers the same to each element of the mobile terminal 500. The interface unit also allows data to be transmitted to the external devices from the mobile terminal 500. For example, the interface unit may include a wireless/wired headset port, an external charge port, a wireless/wired data port, a memory card port, a port for connecting a device having an identification module, an audio input/output (I/O) port, a video I/O port, an earphone port, or the like.

In addition, the mobile terminal 500 may further include a power supply that receives external power and internal power and supplies the same to each element for operations under the control of the controller 530. The power supply may include, for example, a battery, connection ports, a power supply controller, and a charge monitoring unit.

The battery may be a built-in type that can be charged, and may be combined to the body of the terminal to be detachable for the charge. The connection port may be one of the interfaces to which an external charger is electrically connected in order to supply electric power for the battery charge.

The above-described embodiments may be implemented by a computer-readable or an equivalent medium by using, for example, software, hardware, or a combination thereof.

In terms of hardware, the embodiments of the present invention may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. Some embodiments of the present invention may be implemented by the controller 530.

In terms of software, processes and functions of the embodiments of the present invention may be implemented by separate software modules. Each of the software modules may perform at least one function and operation described herein. A software code may be implemented by software applications written by an appropriate program language. The software code may be stored in the memory 520 and may be executed by the controller 530.

Figure 6:
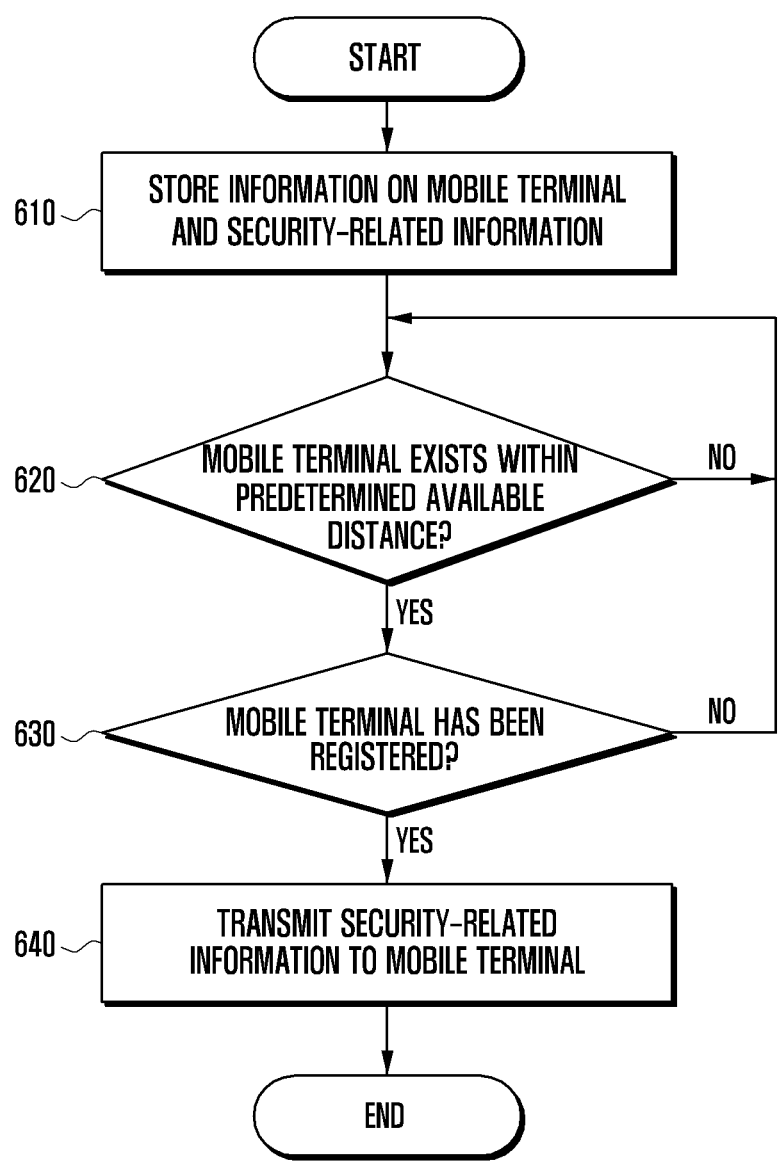
FIG. 6 is a flowchart illustrating the operation of a mobile terminal auxiliary device, according to an embodiment of the present invention.

FIG. 6 is a flowchart illustrating the operation of a mobile terminal auxiliary device, according to an embodiment of the present invention.

Referring to FIG. 6, in step 610, the controller of the mobile terminal auxiliary device controls to store information on at least one mobile terminal in the memory. That is, the mobile terminal auxiliary device stores information on at least one mobile terminal in which the mobile terminal auxiliary device is to be used through registration between the mobile terminal auxiliary device and the mobile terminal. When a user tries to connect with the registered mobile terminal by using the mobile terminal auxiliary device, the mobile terminal performs a function corresponding to the user input without an additional input of security-related information.

According to an embodiment of the present invention, when the mobile terminal and the mobile terminal auxiliary device are connected for the first time through short-range communication by, for example, the BT or BTLE module, the process for mutual registration is triggered.

Further, according to an embodiment of the present invention, in the case of authenticating the mobile terminal auxiliary device by using security information for the user identification, which is stored in the mobile terminal, the mobile terminal auxiliary device is controlled to store the information on the mobile terminal. For example, when the mobile terminal auxiliary device and the mobile terminal are connected with each other through short-range communication, the user is identified by entering security information, such as, for example, a predetermined password, and then the mobile terminal transmits its own identification information to the mobile terminal auxiliary device. Then, the mobile terminal auxiliary device stores the received identification information of the mobile terminal in the memory.

The information on the mobile terminal is, for example, an identifier of the mobile terminal or an intrinsic number that is randomly generated, but it is not limited thereto.

According to an embodiment of the present invention, the registration between the mobile terminal auxiliary device and the mobile terminal is performed by a separate server. For example, when the mobile terminal and the mobile terminal auxiliary device are connected with each other through short-range communication, the user is identified by entering predetermined security information, and then the mobile terminal auxiliary device transmits its own identification information to the server. According to an embodiment of the present invention, the mobile terminal auxiliary device transmits information on the mobile terminal to the server, or the mobile terminal transmits its own identification information to the server. The server stores the received identification information of the mobile terminal and identification information of the mobile terminal auxiliary device. Then, in the case of using the mobile terminal or the mobile terminal auxiliary device through wireless and wired communication with the mobile terminal or the mobile terminal auxiliary device, the server transmits information on whether the devices have been registered to each other.

According to an embodiment of the present invention, in step 610, the mobile terminal auxiliary device also stores security-related information on at least one mobile terminal. The security-related information includes, for example, a password for releasing the locked state of the mobile terminal, a password for releasing the locked state of specific applications, and log-on information of account based applications, such as e-mails and SNS. In addition, if specific applications are configured to be executed only by using the mobile terminal auxiliary device in the mobile terminal, security information for executing the specific applications is stored. For example, in the case of making a payment by using the mobile terminal, the mobile terminal and the mobile terminal auxiliary device is configured such that the payment is approved only when the payment is made by using the registered mobile terminal auxiliary device. Also, the mobile terminal auxiliary device stores security information for the payment. According to an embodiment of the present invention, the mobile terminal auxiliary device stores mobile terminal setup information to allow a user to set the mobile terminal or contents according to the user's desire.

Referring back to FIG. 6, in step 620, the controller of the mobile terminal auxiliary device determines whether a mobile terminal exists within a predetermined available distance. The mobile terminal auxiliary device measures the intensity of signals through the short-range communication module included in the communication unit, and determine whether the mobile terminal exists within the predetermined available distance based on the measured signals, according to an embodiment of the present invention. The intensity of signals is, for example, a received signal strength indicator (RSSI).

According to an embodiment of the present invention, the intensity of signals is measured by the mobile terminal auxiliary device when a signal for use of the mobile terminal auxiliary device is detected. For example, when a user instruction is input through the user input unit included in the mobile terminal auxiliary device, the controller determines whether the mobile terminal exists within the predetermined available distance. The user instruction through the user input unit is an input of a touch signal or a selection signal by a hardware switch such as a button.

If the mobile terminal exists within the predetermined available distance, the controller of the mobile terminal auxiliary device determines whether the detected mobile terminal is the registered mobile terminal on the basis of the information of at least one mobile terminal, which is stored in step 610. For example, the controller of the mobile terminal auxiliary device determines whether identification information of the mobile terminal detected in step 620 is identical to the identification information of the mobile terminal stored in the memory of the mobile terminal auxiliary device. Alternatively, the controller determines whether the intrinsic number randomly generated, which is stored in the mobile terminal detected in step 620 is identical to the intrinsic number randomly generated, which is stored in the memory of the mobile terminal auxiliary device.

According to an embodiment of the present invention, if the detected mobile terminal is the registered mobile terminal, the controller transmits security-related information to the mobile terminal, in step 640.

It is illustrated in the drawing that the security-related information is stored in the mobile terminal auxiliary device, but the present invention is not limited thereto. For example, the mobile terminal may store the security-related information during the process of registration between the mobile terminal and the mobile terminal auxiliary device, in step 610. Alternatively, the security-related information may be stored in the server. In this case, step 640, where the security-related information is transmitted to the mobile terminal, may be omitted.

Figure 7:
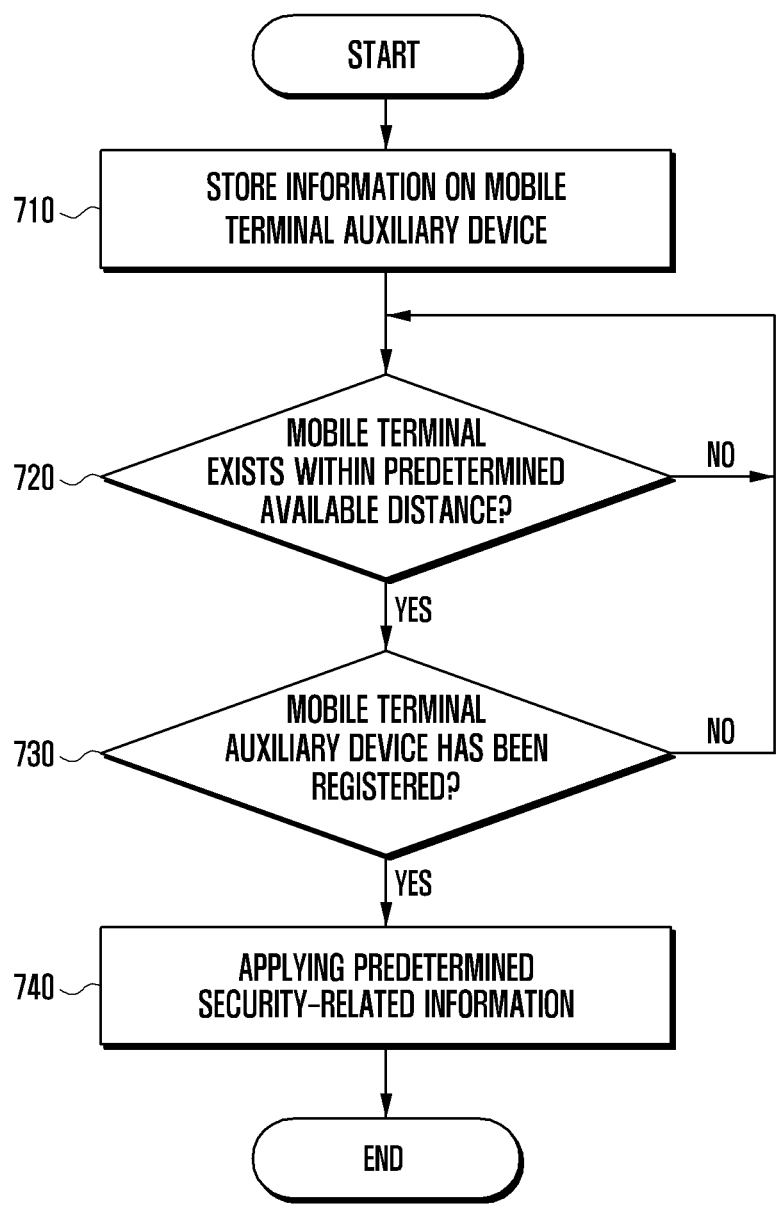
FIG. 7 is a flowchart illustrating the operation of a mobile terminal, according to an embodiment of the present invention.

FIG. 7 is a flowchart illustrating the operation of a mobile terminal, according to an embodiment of the present invention.

Referring to FIG. 7, in step 710, the controller of the mobile terminal controls to store information on at least one mobile terminal auxiliary device in the memory. That is, the mobile terminal stores information on at least one mobile terminal auxiliary device that is to be used with respect to the mobile terminal through registration between the mobile terminal auxiliary device and the mobile terminal. When a user tries to connect with the mobile terminal by using the mobile terminal auxiliary device, the mobile terminal performs the function corresponding to the user input without an additional input of security-related information.

According to an embodiment of the present invention, when the mobile terminal and the mobile terminal auxiliary device are connected for the first time through short-range communication by, for example, the BT orBTLE module, the process for mutual registration is triggered.

Further, according to an embodiment of the present invention, in the case of authenticating the mobile terminal auxiliary device by using security information for the user identification, which is stored in the mobile terminal, the mobile terminal is controlled to store the information on the mobile terminal auxiliary device. For example, when the mobile terminal auxiliary device and the mobile terminal are connected with each other through short-range communication, the user is identified by entering security information, such as a predetermined password, and then the mobile terminal auxiliary device transmits its own identification information to the mobile terminal. Then, the mobile terminal stores the received identification information of the mobile terminal auxiliary device in the memory.

The information on the mobile terminal auxiliary device is, for example, an identifier of the mobile terminal auxiliary device or an intrinsic number that is randomly generated, but it is not limited thereto.

According to an embodiment of the present invention, the registration between the mobile terminal auxiliary device and the mobile terminal may also be made by a separate server, as described above with respect to FIG. 6. For example, when the mobile terminal and the mobile terminal auxiliary device are connected with each other through short-range communication, the user is identified by entering predetermined security information, and then the mobile terminal transmits its own identification information to the server. According to an embodiment of the present invention, the mobile terminal transmits information on the mobile terminal auxiliary device to the server, or the mobile terminal auxiliary device transmits its own identification information to the server. The server stores the received identification information of the mobile terminal and identification information of the mobile terminal auxiliary device. Further, in the case of using the mobile terminal or the mobile terminal auxiliary device through wireless and wired communication with the mobile terminal and the mobile terminal auxiliary device, the server transmits information on whether the devices have been registered with each other.

According to an embodiment of the present invention, in step 710, the mobile terminal also stores security-related information on at least one mobile terminal auxiliary device. The security-related information includes, for example, a password for releasing the locked state of the mobile terminal, a password for releasing the locked state of specific applications, and log-on information of account based applications, such as e-mails and SNS. In addition, if specific applications are configured to be executed only by using the mobile terminal auxiliary device in the mobile terminal, security information for executing the specific applications are stored. For example, in the case of making a payment by using the mobile terminal, the mobile terminal and the mobile terminal auxiliary device are configured so that the payment is approved only when the payment is made by using the registered mobile terminal auxiliary device. Also, the mobile terminal auxiliary device stores security information for the payment. According to an embodiment of the present invention, the mobile terminal stores mobile terminal setup information to allow a user to set the mobile terminal or contents according to a user's desire depending on the mobile terminal auxiliary device.

Referring again to FIG. 7, in step 720, the controller of the mobile terminal determines whether a mobile terminal auxiliary device exists within a predetermined available distance. The mobile terminal measures the intensity of signals through the short-range communication module included in the communication unit, and determines whether the mobile terminal auxiliary device exists within the predetermined available distance based on the measured signals, according to an embodiment of the present invention. The intensity of signals is, for example, an RSSI.

According to an embodiment of the present invention, the intensity of signals is measured by the mobile terminal when a signal for use of the mobile terminal is detected. For example, when a user instruction is input through the user input unit included in the mobile terminal, the controller determines whether the mobile terminal auxiliary device exists within the predetermined available distance. The user instruction through the user input unit is an input of a touch signal or a selection signal by a hardware switch, such as a button.

If the mobile terminal auxiliary device exists within the predetermined available distance, in step 730, the controller of the mobile terminal determines whether the detected mobile terminal auxiliary device is the registered mobile terminal auxiliary device on the basis of the information on at least one mobile terminal auxiliary device, which is stored in step 710. For example, the controller of the mobile terminal determines whether identification information of the mobile terminal auxiliary device detected in step 720 is identical to the identification information of the mobile terminal auxiliary device, which is stored in the memory of the mobile terminal. Alternatively, the controller determines whether the intrinsic number randomly generated, which is stored in the mobile terminal auxiliary device detected in step 720 is identical to the intrinsic number randomly generated, which is stored in the memory of the mobile terminal.

In step 740, the mobile terminal applies the security-related information on the mobile terminal auxiliary device, which is stored in step 710.

It is illustrated in the drawing that the security-related information is stored in the mobile terminal, but the present invention is not limited thereto. According to an embodiment of the present invention, the mobile terminal auxiliary device or the server stores the security-related information on the mobile terminal auxiliary device. If it is determined that the mobile terminal auxiliary device detected in step 720 is the registered mobile terminal auxiliary device, in step 730, the communication unit of the mobile terminal receives the security-related information from the mobile terminal auxiliary device or the server. The controller of the mobile terminal applies the received security-related information.

Figure 8A:
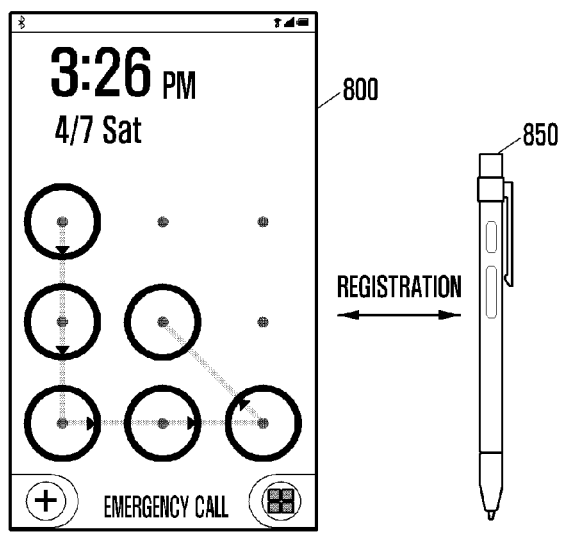
FIGS. 8A and 8B are diagrams illustrating registration between a mobile terminal and a mobile terminal auxiliary device and the operation thereof, according to an embodiment of the present invention.
Figure 8B:
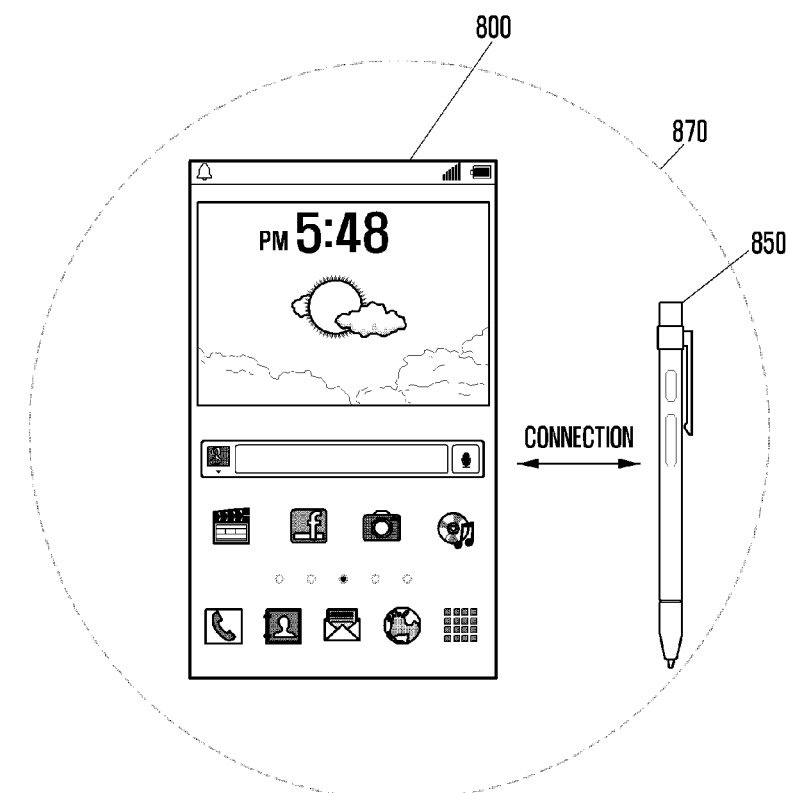

FIGS. 8A and 8B are diagrams illustrating registration between a mobile terminal and a mobile terminal auxiliary device and an operation thereof, according to an embodiment of the present invention. FIGS. 9A and 9B are diagrams illustrating an available distance, according to an embodiment of the present invention.

Referring to FIG. 8A, a registration between a mobile terminal 800 and a mobile terminal auxiliary device 850 is processed. According to an embodiment of the present invention, the mobile terminal auxiliary device 850 is embodied as an electronic pen, including a stylus.

The registration between the mobile terminal 800 and the mobile terminal auxiliary device 850 is triggered when communication between the mobile terminal 800 and the mobile terminal auxiliary device 850 is made for the first time, for example, through short-range communication by the BT or BTLE module.

According to an embodiment of the present invention, the registration process between the mobile terminal 800 and the mobile terminal auxiliary device 850 is executed, when a message for registering the mobile terminal auxiliary device 850 is input to the mobile terminal 800. The message for registering the mobile terminal auxiliary device is displayed in the form of a popup window, but it is not limited thereto, and the message may be in the form of a button input of the mobile terminal.

The registration process between the mobile terminal 800 and the mobile terminal auxiliary device 850 is executed, when the mobile terminal auxiliary device is authenticated by the mobile terminal 800 through security information for the user identification, as shown in FIG. 8A. For example, when a predetermined password or specific pattern is entered in the mobile terminal 800, the registration between the mobile terminal 800 and the mobile terminal auxiliary device 850 is processed.

When the registration between the mobile terminal 800 and the mobile terminal auxiliary device 850 is processed, the mobile terminal 800 stores information on the mobile terminal auxiliary device 850. The mobile terminal 800 receives identification information of the mobile terminal 800 from the mobile terminal auxiliary device 850 through the communication unit. In addition, according to an embodiment of the present invention, the mobile terminal auxiliary device 850 stores information on the mobile terminal 800. The mobile terminal auxiliary device 850 receives identification information on the mobile terminal auxiliary device 850 from the mobile terminal 800 through the communication unit. Alternatively, according to an embodiment of the present invention, the mobile terminal 800 and the mobile terminal auxiliary device 850 store the same intrinsic number that is randomly generated.

According to an embodiment of the present invention, the registration between the mobile terminal and the mobile terminal auxiliary device is made by the separate server, which is described in detail above with respect to FIGS. 6 and 7.

The information to be stored includes security-related information on the mobile terminal 800 or the mobile terminal auxiliary device 850. That is, the information includes a password for releasing the locked state of the mobile terminal 800 or the mobile terminal auxiliary device 850, a password for a specific application, and log-on information of e-mails and SNS. For example, when a plurality of mobile terminal auxiliary devices 850 are registered with respect to the mobile terminal 800, the mobile terminal 800 differently restricts the use of the registered mobile terminal auxiliary device 850. That is, the mobile terminal 800 does not allow the first mobile terminal auxiliary device to access specific applications, but allows the second mobile terminal auxiliary device to access all the applications. When the first mobile terminal auxiliary device is registered with the mobile terminal, security information for restricting the access of the first mobile terminal auxiliary device to the specific applications is stored. Further, when the second mobile terminal auxiliary device is registered with the mobile terminal, security information to allow the access of the second mobile terminal auxiliary device to all the applications is stored.

As shown in FIG. 8B, if the mobile terminal 800 and the mobile terminal auxiliary device 850 are located within a predetermined available distance 870, they may be connected with each other.

According to an embodiment of the present invention, the mobile terminal 800 and the mobile terminal auxiliary device 850 measure the intensity of signals through the short-range communication module included in the communication unit, and determine whether the mobile terminal 800 and the mobile terminal auxiliary device 850 exist within the predetermined available distance 870 based on the measured signals. The intensity of signals is measured, when the signal for use of the mobile terminal auxiliary device 850 or the mobile terminal 800 is detected, according to an embodiment of the present invention.

As shown in FIG. 9A, a mobile terminal 900 measures the intensity of communication signals with respect to a mobile terminal auxiliary device 950. The RSSI is measured through the short-range communication module. According to an embodiment of the present invention, it is configured so that even though the mobile terminal 900 and the mobile terminal auxiliary device 950 exist within a connection distance 980 by which they can communicate with each other through the short-range communication, they can actually be connected with each other only when the mobile terminal 900 and the mobile terminal auxiliary device 950 exist within a predetermined available distance 970. Thus, a second connection device 960 is unable to be connected with the mobile terminal 900.

As shown in FIG. 9B, since the intensity of signals decreases depending on the distance from the mobile terminal 900, it is determined whether the mobile terminal auxiliary device 950 exists within the predetermined available distance 970 from the mobile terminal 900 by measuring the intensity of signals.

If the mobile terminal auxiliary device 950 exists beyond the available distance 980, the mobile terminal 900 and the mobile terminal auxiliary device 950 are completely disconnected. According to an embodiment of the present invention, it is determined that the mobile terminal auxiliary device 950 is lost, as described in greater detail below.

Returning to FIG. 8B, if the mobile terminal 800 and the mobile terminal auxiliary device 850 exist within the predetermined available distance 870, the mobile terminal 800 and the mobile terminal auxiliary device 850 determine whether they have been registered with respect to each other, as described above with respect to FIGS. 6 and 7.

If it is determined that the mobile terminal 800 and the mobile terminal auxiliary device 850 have been registered with respect to each other, the mobile terminal 800 is used on the basis of the security-related information on the mobile terminal 800 or the mobile terminal auxiliary device 850.

Figure 10:
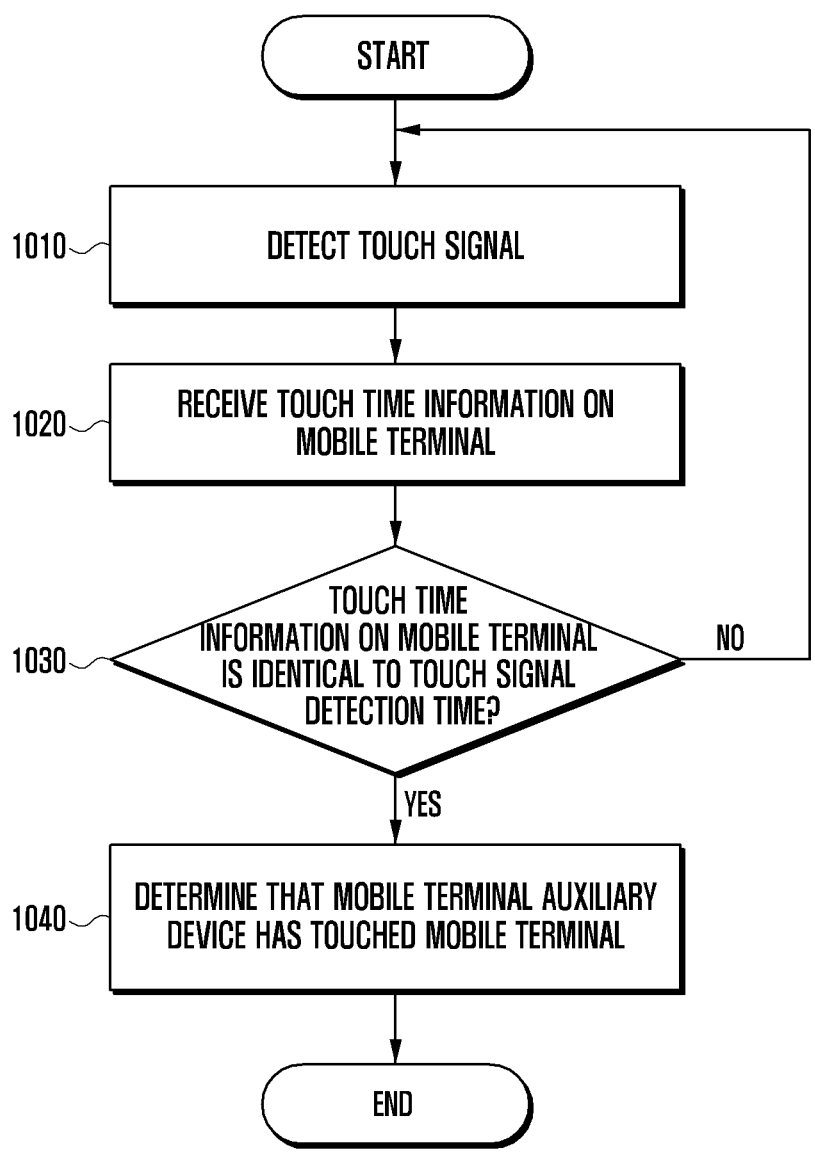
FIG. 10 is a flowchart illustrating a determination of whether a mobile terminal auxiliary device is in use by the mobile terminal auxiliary device, according to an embodiment of the present invention.

FIG. 10 is a flowchart illustrating a determination of whether a mobile terminal auxiliary device is in use by the mobile terminal auxiliary device, according to an embodiment of the present invention.

According to an embodiment of the present invention, the mobile terminal auxiliary device is embodied as an electronic pen including a touch sensor. In the case of touching the mobile terminal with the mobile terminal auxiliary device, it is determined that the mobile terminal and the mobile terminal auxiliary device are in use.

Even though the touch signal is input to the mobile terminal auxiliary device, the controller of the mobile terminal auxiliary device cannot determine which object the mobile terminal auxiliary device has made a touch on. That is, even when the mobile terminal auxiliary device makes a touch on an object other than the mobile terminal, and then the touch signal is input through the touch input unit, the mobile terminal auxiliary device can not recognize the object but sense the touch signal only.

Likewise, when the mobile terminal receives a touch signal on the touch screen including the touch sensor, the mobile terminal can not determine which object has touched the touch screen. That is, even with the touch signal on the touch screen of the mobile terminal, the touch signal may be input by other pointers, such as fingers, other than the mobile terminal auxiliary device. In this case, the mobile terminal determines a touch point only, but may not determine which object generates the touch signal.

Accordingly, in order to determine whether the mobile terminal auxiliary device is used, it is required in advance to determine whether the touch on the mobile terminal is made by the mobile terminal auxiliary device.

Referring to FIG. 10, the mobile terminal auxiliary device detects a touch signal of the mobile terminal auxiliary device, in step 1010. The controller extracts time information on the detection of the touch signal.

In step 1020, the mobile terminal auxiliary device receives touch time information on the time when the touch signal is detected by the mobile terminal from the mobile terminal. That is, when the touch signal is also input to the mobile terminal, the mobile terminal transmits information on the time when the touch signal is input, to the mobile terminal auxiliary device, and the mobile terminal auxiliary device receives the information.

In step 1030, the mobile terminal auxiliary device compares the time information on the touch signal detected by the mobile terminal, which is received in step 1020, with the time information on the detection of the touch signal in the mobile terminal auxiliary device of step 1010. That is, the mobile terminal auxiliary device determines whether the input time of the touch signal in the mobile terminal auxiliary device is identical to the input time of the touch signal in the mobile terminal.

If the input time of the touch signal in the mobile terminal auxiliary device is different from the input time of the touch signal in the mobile terminal, it is determined that the touch signal input to the mobile terminal auxiliary device is generated by touching, not the mobile terminal, but other objects with the mobile terminal auxiliary device.

If the input time of the touch signal in the mobile terminal auxiliary device is identical to the input time of the touch signal in the mobile terminal, the controller determines that the mobile terminal auxiliary device has touched the mobile terminal, and consequentially, the mobile terminal auxiliary device is in use.

In addition, although not shown in the drawing, the mobile terminal auxiliary device transmits the determination result to the mobile terminal, according to an embodiment of the present invention.

Figure 11:
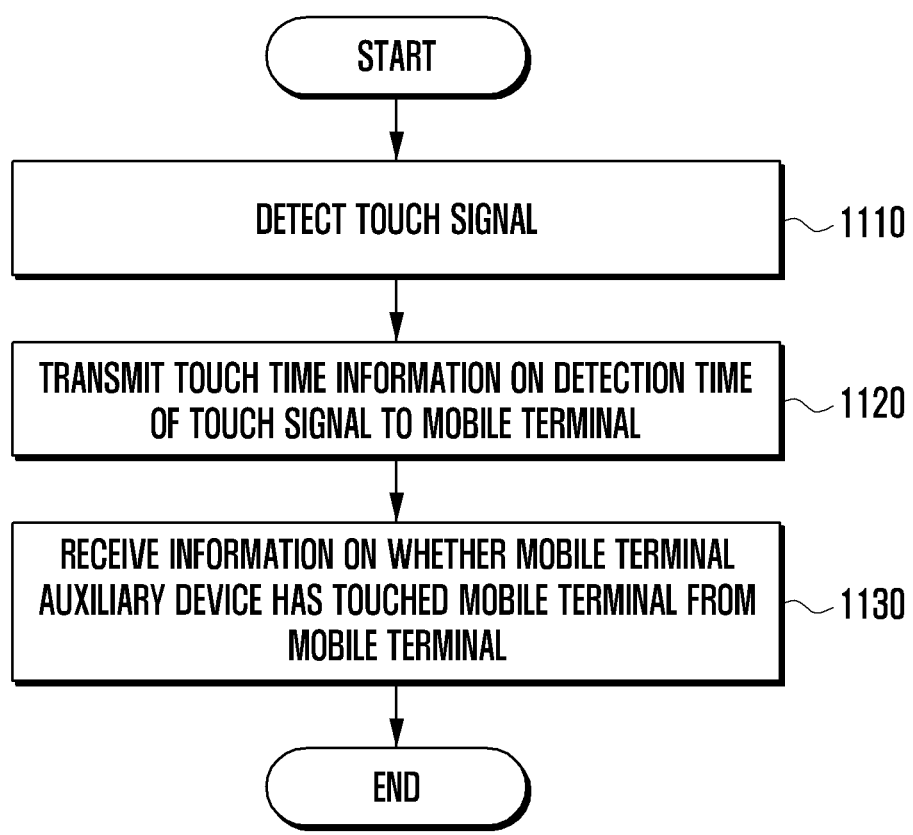
FIG. 11 is a flowchart illustrating a determination of whether a mobile terminal auxiliary device is in use by the mobile terminal auxiliary device, according to another embodiment of the present invention.

FIG. 11 is a flowchart illustrating a determination of whether a mobile terminal auxiliary is in use by the mobile terminal auxiliary device, according to another embodiment of the present invention.

Referring to FIG. 11, the mobile terminal auxiliary device detects a touch signal of the mobile terminal auxiliary device, in step 1110. The controller extract times information on the detection of the touch signal.

In step 1120, the mobile terminal auxiliary device transmits the time information of the detection of the touch signal to the mobile terminal. In addition, the mobile terminal auxiliary device receives information on whether the mobile terminal auxiliary device has touched the mobile terminal from the mobile terminal, in step 1130.

In the embodiment of FIG. 11, unlike the embodiment of FIG. 10, the mobile terminal determines whether the mobile terminal auxiliary device has been used. In addition, the mobile terminal is configured to transmit information on whether the touch of the mobile terminal auxiliary device has been made on the mobile terminal to the mobile terminal auxiliary device. According to an embodiment of the present invention, when it is determined that the touch of the mobile terminal auxiliary device is not made on the mobile terminal, the mobile terminal is configured not to transmit a separate response signal to the mobile terminal auxiliary device.

The mobile terminal auxiliary device determines whether the mobile terminal auxiliary device has been used with respect to the mobile terminal by using the received information in step 1130.

Figure 12:
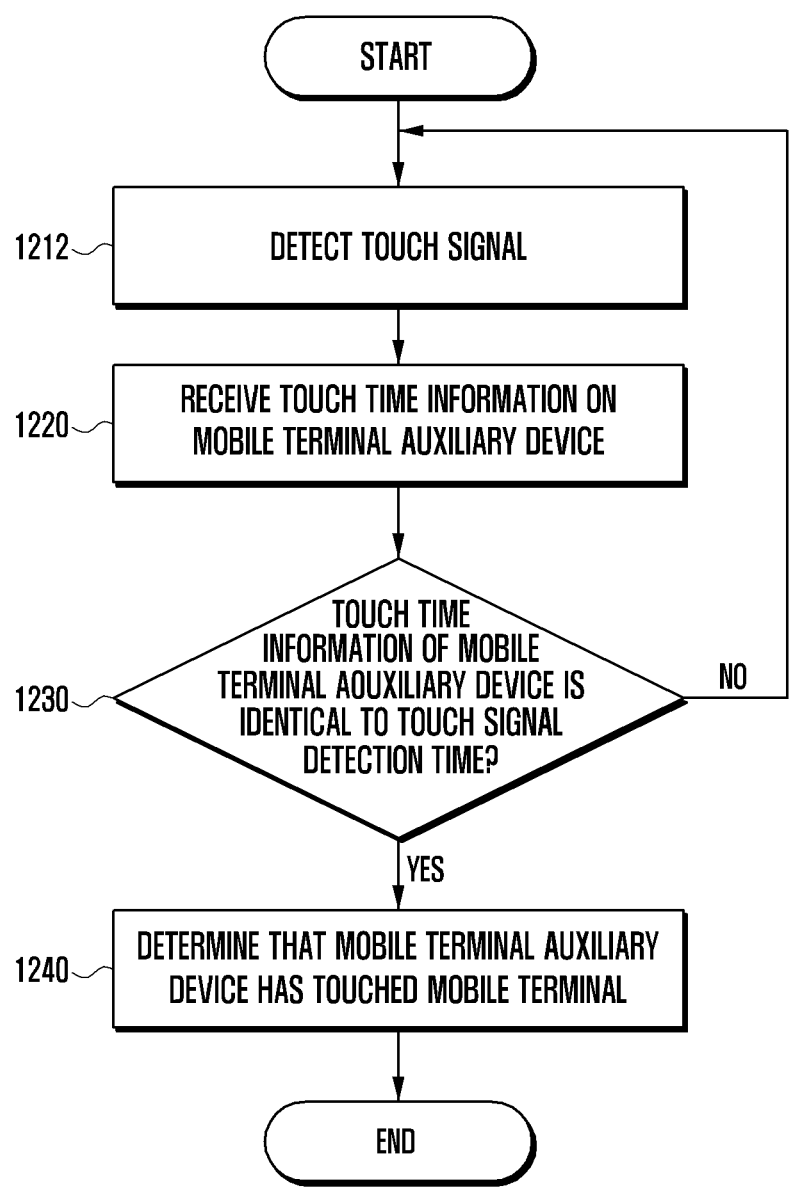
FIG. 12 is a flowchart illustrating a determination of whether a mobile terminal auxiliary device is in used by a mobile terminal, according to an embodiment of the present invention.

FIG. 12 is a flowchart illustrating a determination of whether a mobile terminal auxiliary device is used by a mobile terminal, according to an embodiment of the present invention.

Referring to FIG. 12, the mobile terminal detects a touch signal with respect to the mobile terminal, in step 1210. The controller extracts time information on the detection of the touch signal.

In step 1220, the mobile terminal receives information on the time when the touch signal is detected by the mobile terminal auxiliary device from the mobile terminal auxiliary device. That is, when the touch signal is also input to the mobile terminal auxiliary device, the mobile terminal auxiliary device transmits information on the time when the touch signal is input, to the mobile terminal, and the mobile terminal receives the information.

In step 1230, the mobile terminal compares the time information on the touch signal detected by the mobile terminal auxiliary device, which is received in step 1220, with the time information on the detection of the touch signal of the mobile terminal auxiliary device in step 1210. That is, the mobile terminal may determine whether the input time of the touch signal in the mobile terminal is identical to the input time of the touch signal in the mobile terminal auxiliary device.

If the input time of the touch signal in the mobile terminal is different from the input time of the touch signal in the mobile terminal auxiliary device, it is determined that the touch signal in the mobile terminal auxiliary device is generated by touching, not the mobile terminal, but other objects with the mobile terminal auxiliary device.

If the input time of the touch signal in the mobile terminal is identical to the input time of the touch signal in the mobile terminal auxiliary device, the controller of the mobile terminal determines that the mobile terminal auxiliary device has touched the mobile terminal, in step 1240, and consequentially, the mobile terminal auxiliary device is in use.

In addition, the mobile terminal transmits the determination result to the mobile terminal auxiliary device, according to an embodiment of the present invention.

Figure 13:
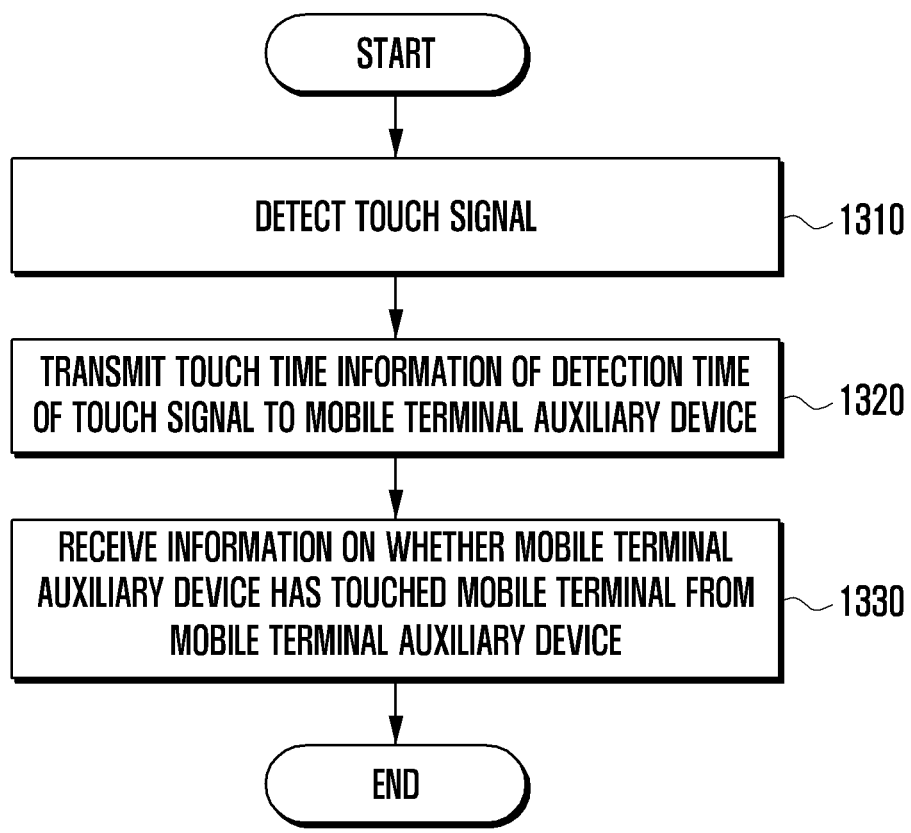
FIG. 13 is a flowchart illustrating a determination of whether a mobile terminal auxiliary device is in use by a mobile terminal, according to another embodiment of the present invention.

FIG. 13 is a flowchart illustrating a determination of whether a mobile terminal auxiliary is used by a mobile terminal, according to another embodiment of the present invention.

Referring to FIG. 13, the mobile terminal detects a touch signal of the mobile terminal, in step 1310. At this time, the controller extracts time information on the detection of the touch signal.

In step 1320, the mobile terminal transmits the time information of the detection of the touch signal to the mobile terminal auxiliary device. In addition, the mobile terminal receives information on whether the mobile terminal auxiliary device has touched the mobile terminal from the mobile terminal auxiliary device, in step 1330.

In the embodiment of FIG. 13, unlike the embodiment of FIG. 12, the mobile terminal auxiliary device determines whether the mobile terminal auxiliary device has been used. In addition, the mobile terminal auxiliary device is configured to transmit information on whether the touch of the mobile terminal auxiliary device is made on the mobile terminal to the mobile terminal. According to an embodiment of the present invention, when it is determined that the touch of the mobile terminal auxiliary device is not made on the mobile terminal, the mobile terminal auxiliary device is configured not to transmit a separate response signal to the mobile terminal.

The mobile terminal determines whether the mobile terminal auxiliary device has been used with respect to the mobile terminal by using the received information, in step 1330.

FIGS. 14A-14C are diagrams illustrating a determination of whether a mobile terminal auxiliary device has been used, according to an embodiment of the present invention.

Referring to FIG. 14A, a mobile terminal auxiliary device 1450 comes within the predetermined available distance while the screen of a mobile terminal 1400 is turned off. The mobile terminal 1400 or the mobile terminal auxiliary device 1450 determines whether the mobile terminal auxiliary device 1450 or the mobile terminal 1400 exists within the predetermined available distance. For example, the mobile terminal 1400 measures the RSSI through the short-range communication with the mobile terminal auxiliary device 1450, and determines whether the mobile terminal auxiliary device 1450 exists within the predetermined available distance on the basis of the measured intensity of the signal.

Even though the mobile terminal 1400 and the mobile terminal auxiliary device 1450 exist within the predetermined available distance, according to an embodiment of the present invention, the mobile terminal 1400 or the mobile terminal auxiliary device 1450 determines whether the mobile terminal auxiliary device 1450 or the mobile terminal 1400 exists within the predetermined available distance only when the mobile terminal auxiliary device 1450 is in use.

As shown in FIG. 14B, the use of the mobile terminal auxiliary device is determined according to the method described with reference to FIGS. 10 to 13.

For example, when the mobile terminal auxiliary device 1450 touches the mobile terminal 1400, the mobile terminal auxiliary device 1450 detects the touch signal. The mobile terminal auxiliary device 1450 extracts time information on the detection of the touch signal. Further, the mobile terminal 1400 also extracts time information on the detection of the touch signal upon the touch of the mobile terminal auxiliary device 1450.

The mobile terminal auxiliary device 1450 transmits the information on the detection of the touch signal of the mobile terminal auxiliary device 1450 to the mobile terminal 1400. Alternatively, according to an embodiment of the present invention, the mobile terminal 1400 transmits the information on the detection of the touch signal of the mobile terminal 1400 to the mobile terminal auxiliary device 1450.

The mobile terminal 1400 compares the time when the touch signal is input to the mobile terminal auxiliary device 1450, which is received from the mobile terminal auxiliary device 1450, with the time when the touch signal is input to the mobile terminal 1400. Alternatively, according to an embodiment of the present invention, the mobile terminal auxiliary device 1450 compares the time when the touch signal is input to the mobile terminal 1400, which is received from the mobile terminal 1400, with the time when the touch signal is input to the mobile terminal auxiliary device 1450.

If the touch signal is input to the mobile terminal 1400 and the mobile terminal auxiliary device 1450 at the same time, the controller of the mobile terminal 1400 or the mobile terminal auxiliary device 1450 determines that the mobile terminal auxiliary device 1450 has touched the mobile terminal 1400.

Afterward, the mobile terminal 1400 or the mobile terminal auxiliary device 1450 determines whether the mobile terminal auxiliary device 1450 and the mobile terminal 1400, which are existing within the predetermined available distance, have been registered with respect to each other. If it is determined that the mobile terminal 1400 and the mobile terminal auxiliary device 1450 have been registered with respect to each other, as shown in FIG. 14C, the mobile terminal 1400 may be turned to be in use by applying the predetermined security-related information.

According to an embodiment of the present invention, after the mobile terminal 1400 or the mobile terminal auxiliary device 1450 determines whether the mobile terminal auxiliary device 1450 or the mobile terminal 1400 exists within the available distance, if the mobile terminal auxiliary device 1450 exists within the available distance, it is determined whether the existing mobile terminal auxiliary device 1450 is in use.

For example, even though the mobile terminal auxiliary device 1450 is detected within the available distance of the mobile terminal 1400, if the mobile terminal auxiliary device 1450 is not in use, it is not necessary to determine whether the mobile terminal auxiliary device 1450 has been registered. On the contrary, if the mobile terminal auxiliary device 1450 is in use, it should be determined whether the mobile terminal auxiliary device 1450 has been registered. Accordingly, the mobile terminal 1400 determines whether the mobile terminal auxiliary device 1450 is the registered one after determining whether the mobile terminal auxiliary device 1450 exists within the available distance and whether the detected mobile terminal auxiliary device 1450 is in use.

FIGS. 15A-15D are diagrams illustrating using of mobile terminals and mobile terminal auxiliary devices, according to an embodiment of the present invention.

Figure 15D:
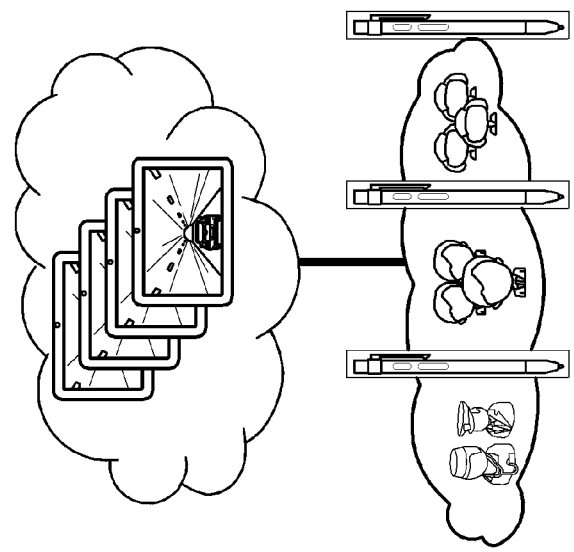
FIGS. 15A-15D are diagrams illustrating uses of mobile terminals and mobile terminal auxiliary devices, according to an embodiment of the present invention.
Figure 15C:
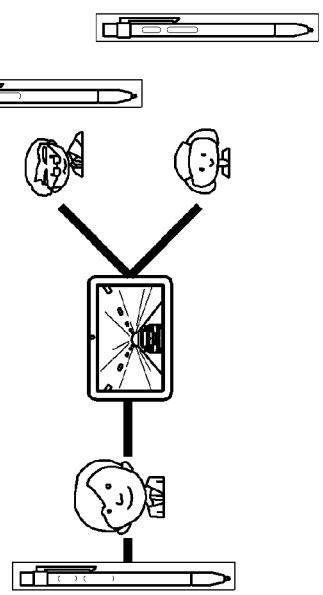
Figure 15B:
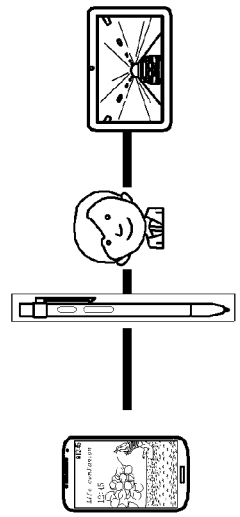
Figure 15A:
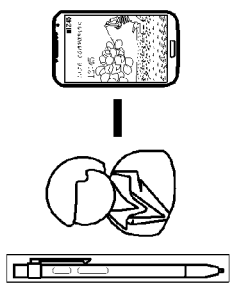

Referring to FIG. 15A, one user uses one mobile terminal auxiliary device with respect to one mobile terminal. The user configures the mobile terminal according to his or her desire. Accordingly, security-related information including setup information of the mobile terminal may be stored in the mobile terminal or the mobile terminal auxiliary device during the registration process between the mobile terminal and the mobile terminal auxiliary device. Afterward, when the user uses the mobile terminal by using the mobile terminal auxiliary device, the mobile terminal is configured according to the pre-stored setup information to thereby enable the user to conveniently use the mobile terminal.

Alternatively, as shown in FIG. 15B, one user may use a plurality of mobile terminals by using one mobile terminal auxiliary device. The user uses specific information with consistency over the plurality of mobile terminals. Accordingly, the user stores security information including setup information, which he or she desires in the mobile terminal auxiliary device, according to an embodiment of the present invention. In addition, when the user switches from the first mobile terminal to the second mobile terminal, the user configures and uses the second mobile terminal according to the setup information stored in the mobile terminal auxiliary device.

As shown in FIG. 15C, a plurality of users use one mobile terminal by using their own mobile terminal auxiliary devices. The users share contents of the mobile terminal with other users while protecting privacy. Accordingly, each user stores security-related information including a password, which prevents other people from viewing his or her private information in the mobile terminal, in the mobile terminal auxiliary device. Alternatively, it may be configured that security-related information is stored in the mobile terminal, and the security is deactivated only when a predetermined mobile terminal auxiliary device is connected with the mobile terminal.

As shown in FIG. 15D, a plurality of users use a plurality of mobile terminal through a plurality of mobile terminal auxiliary devices. In this case, the users use specific information with consistency over the plurality of mobile terminals, and share contents of the mobile terminal with other users while protecting privacy. In this case, each user stores security-related information including setup information which he or she desires and a password, which prevents other people from viewing his or her private information in the mobile terminal, in the mobile terminal auxiliary device. According to this embodiment of the present invention, the security-related information is stored in a mobile terminal.

Figure 16:
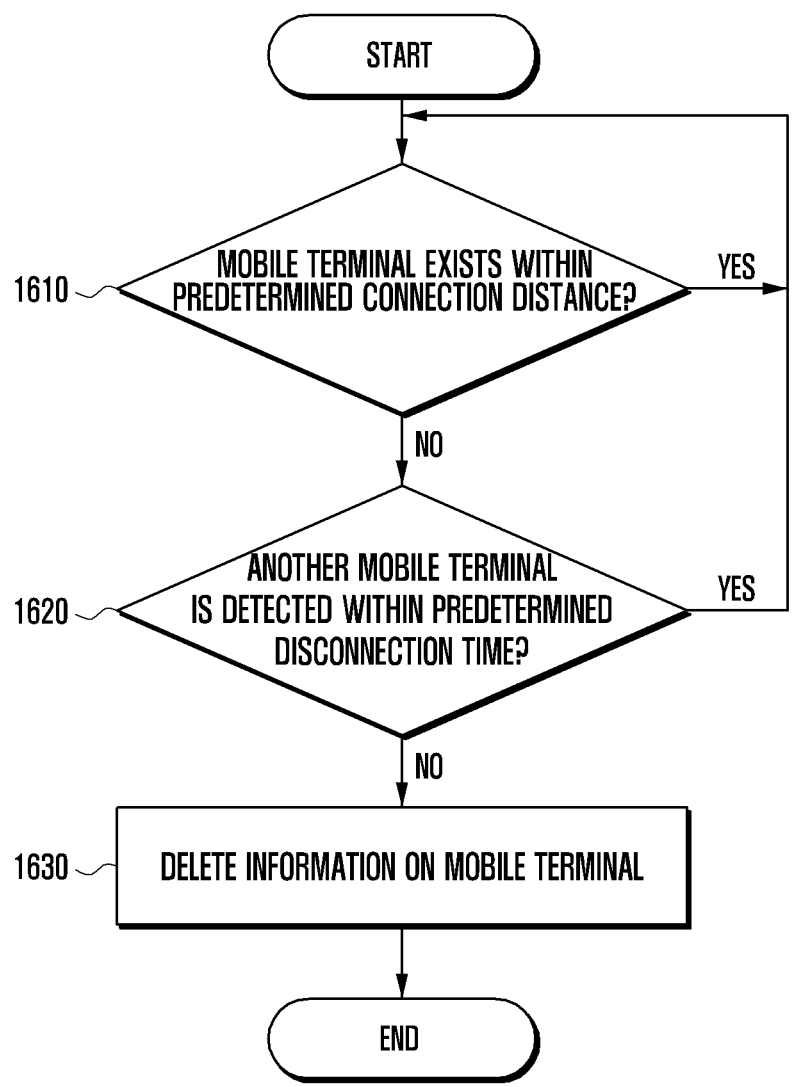
FIG. 16 is a flowchart illustrating deregistration of a mobile terminal auxiliary device and a mobile terminal in a mobile terminal auxiliary device and use of a plurality of mobile terminals depending on a plurality of users, according to an embodiment of the present invention.

FIG. 16 is a flowchart illustrating deregistration of a mobile terminal auxiliary device and a mobile terminal in a mobile terminal auxiliary device and use of a plurality of mobile terminals depending on a plurality of users, according to an embodiment of the present invention.

Referring to FIG. 16, in step 1610, the mobile terminal auxiliary device determines whether the registered mobile terminal exists with a predetermined connection distance. That is, as shown in FIGS. 9A and 9B, it is determined whether the mobile terminal 900 and the mobile terminal auxiliary device 950 are spaced from each other beyond the predetermined connection distance 980. The short-range communication may be available within the predetermined connection distance 980, according to an embodiment of the present invention.

If the mobile terminal does not exist within the predetermined connection distance, it is determined that the mobile terminal auxiliary device is disconnected from the mobile terminal, and the mobile terminal auxiliary device deletes the information from the mobile terminal stored in the memory, in step 1630.

According to an embodiment of the present invention, when it is determined that the registered mobile terminal does not exist within the connection distance, the mobile terminal auxiliary device determines whether the mobile terminal is detected within a predetermined disconnection reference time, in step 1620. That is, the mobile terminal auxiliary device determines whether the mobile terminal does not exist within the predetermined connection distance for the predetermined disconnection reference time. If the mobile terminal is not detected within the predetermined disconnection time, the mobile terminal auxiliary device deletes the information on the mobile terminal in operation 1630.

According to an embodiment of the present invention, as shown in FIGS. 15B-15D, although the mobile terminal auxiliary device is disconnected from the first mobile terminal, the mobile terminal auxiliary device is connected with the second mobile terminal. In this case, the information on the first mobile terminal stored in the mobile terminal auxiliary device is deleted.

However, according to an embodiment of the present invention, the user uses the first mobile terminal again after using the second mobile terminal. In this case, the mobile terminal auxiliary device determines whether the second mobile terminal is connected for the disconnection reference time after the first mobile terminal is disconnected in operation 1620. As a result of the determination, if the second mobile terminal is connected within the predetermined reference time, the mobile terminal auxiliary device does not delete, but instead maintains, the information on the first mobile terminal.

Figure 17:
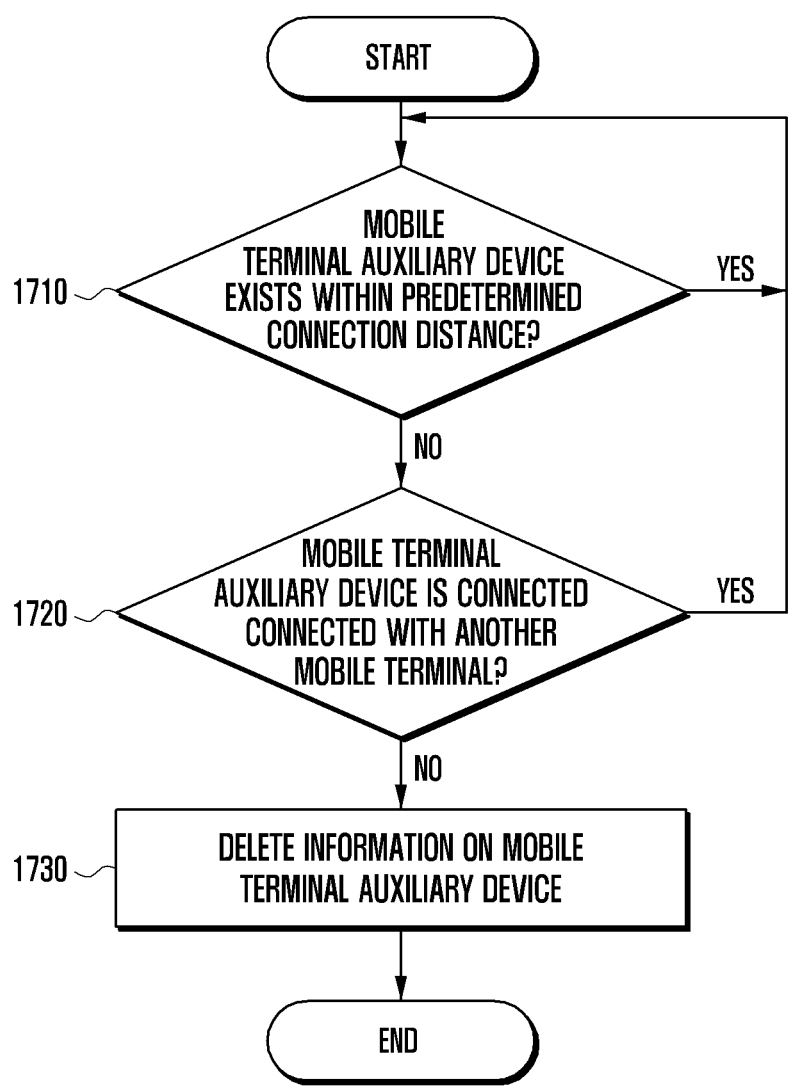
FIG. 17 is a flowchart illustrating deregistration of a mobile terminal auxiliary device and a mobile terminal in a mobile terminal and use of a plurality of mobile terminals depending on a plurality of users, according to an embodiment of the present invention.

FIG. 17 is a flowchart illustrating deregistration of a mobile terminal auxiliary device and a mobile terminal in a mobile terminal and using of a plurality of mobile terminals depending on a plurality of users, according to an embodiment of the present invention.

Referring to FIG. 17, in step 1710, the mobile terminal determines whether the registered mobile terminal auxiliary device exists with a predetermined connection distance. That is, as shown in FIGS. 9A and 9B, it is determined whether the mobile terminal 900 and the mobile terminal auxiliary device 950 are spaced from each other beyond the predetermined connection distance 980. The short-range communication is available within the predetermined connection distance 980, according to an embodiment of the present invention.

If the mobile terminal auxiliary device does not exist within the predetermined connection distance, it is determined that the mobile terminal auxiliary device is disconnected from the mobile terminal, and the mobile terminal deletes the information on the mobile terminal auxiliary device stored in the memory, in step 1730.

According to an embodiment of the present invention, when it is determined that the registered mobile terminal auxiliary device does not exist within the connection distance, the mobile terminal determines whether the mobile terminal auxiliary device is detected within a predetermined disconnection reference time. That is, the mobile terminal may determine whether the mobile terminal auxiliary device does not exist within the predetermined connection distance for the predetermined disconnection reference time. If the mobile terminal auxiliary device is not detected for the predetermined disconnection time, the mobile terminal deletes the information on the mobile terminal auxiliary device in operation 1730.

According to an embodiment of the present invention, as shown in FIGS. 15B-15D, although the mobile terminal auxiliary device is disconnected from the first mobile terminal, the mobile terminal auxiliary device is connected with the second mobile terminal. In this case, the information on the mobile terminal auxiliary device stored in the first mobile terminal is deleted.

However, according to an embodiment of the present invention, the user uses the first mobile terminal again after using the second mobile terminal. The first mobile terminal determines whether the mobile terminal auxiliary device is connected with the second mobile terminal after it is disconnected from the first mobile terminal, in step 1720. As a result of the determination, if the mobile terminal auxiliary device is connected with the second mobile terminal, the first mobile terminal does not delete, but maintains, the information on the mobile terminal auxiliary device.

The first mobile terminal receives information on whether the mobile terminal auxiliary device is connected with the second mobile terminal from the server. That is, when the mobile terminal auxiliary device and at least one mobile terminal are registered with respect to each other, the server stores information on the registration state of the at least one mobile terminal and the mobile terminal auxiliary device. In addition, the mobile terminal or the mobile terminal auxiliary device transmits information on whichever mobile terminal the mobile terminal auxiliary device is connected with and whether the mobile terminal auxiliary device is in use to the server periodically or when specific events are generated. Further, the server stores the received information on the use state of the mobile terminal auxiliary device and the mobile terminal.

If it is determined that the mobile terminal auxiliary device is disconnected from all the mobile terminals and is not in use any more, according to an embodiment of the present invention, the information on the registration state of the mobile terminal and the mobile terminal auxiliary device is deleted. According to an embodiment of the present invention, the server transmits a deregistration instruction to the mobile terminal or the mobile terminal auxiliary device. Afterward, the mobile terminal, or the mobile terminal auxiliary device, which has received the deregistration instruction, deletes the stored information on the mobile terminal auxiliary device or the mobile terminal.

Figure 18:
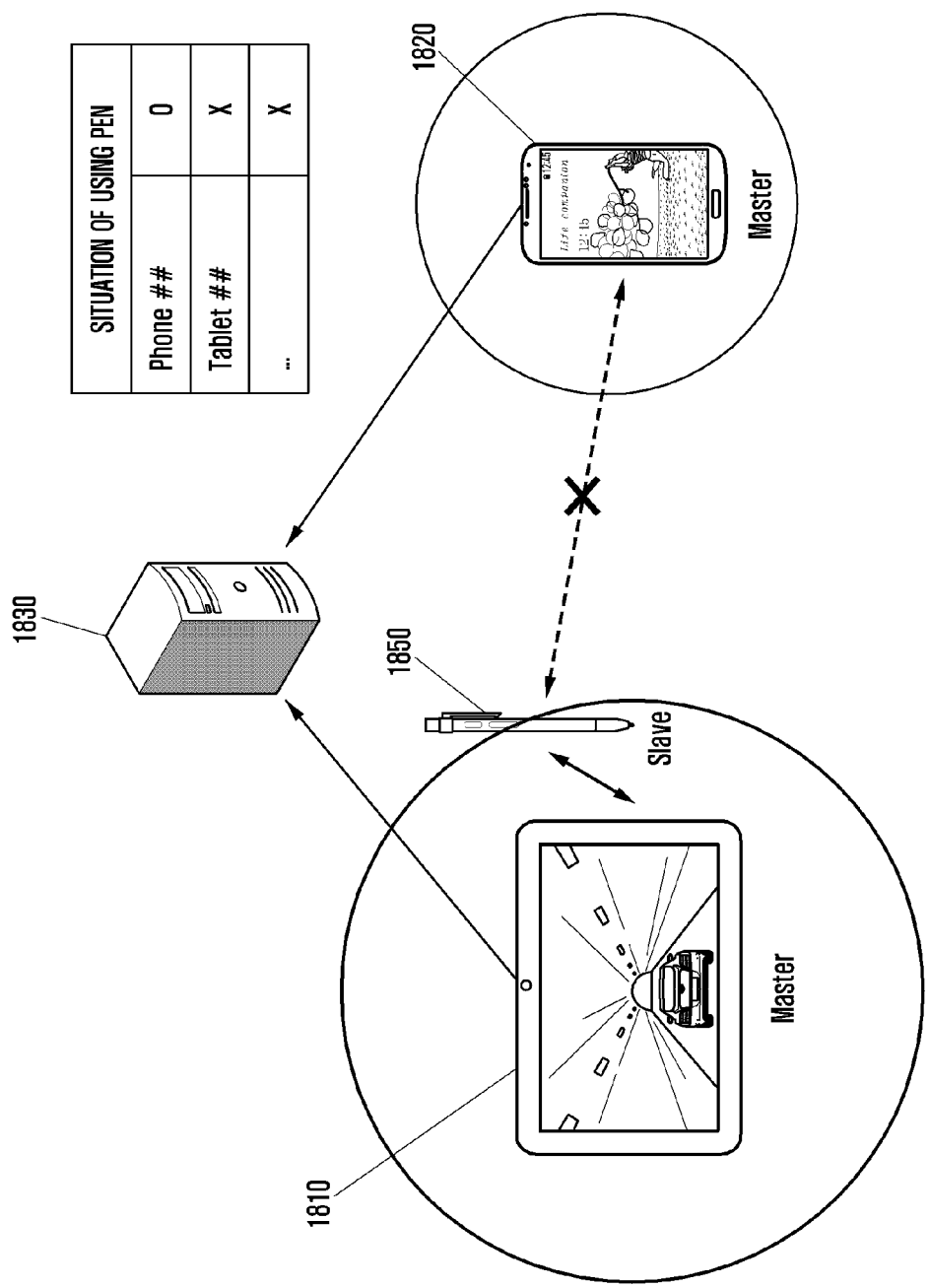
FIG. 18 is a diagram illustrating a method for managing a mobile terminal auxiliary device, according to an embodiment of the present invention.

FIG. 18 is a diagram illustrating a method for managing a mobile terminal auxiliary device, according to an embodiment of the present invention.

Referring to FIG. 18, a server 1830 manages information on the mutual registration of a mobile terminal auxiliary device 1850 and at least one mobile terminal 1810 and/or 1820.

The mobile terminal auxiliary device 1850 leaves the available distance area of the second mobile terminal 1820, while the mobile terminal auxiliary device 1850 is in use in connection with the second mobile terminal 1820. Afterward, the mobile terminal auxiliary device 1850 enters the available distance area of the first mobile terminal 1810 to be connected with the first mobile terminal 1810 for use.

The mobile terminals 1810 and 1820 transmits information on whether they are connected with the mobile terminal auxiliary device 1850 to the server 1830. The server 1830 receives the information on the connection state from the mobile terminals 1810 and 1820, and stores the same.

According to an embodiment of the present invention, the second mobile terminal 1820 receives information stating that the mobile terminal auxiliary device 1850 is disconnected from the second mobile terminal 1820, but it is connected with the first mobile terminal 1810, from the server 1830. That is, the second mobile terminal 1820 determines that the mobile terminal auxiliary device 1850 is not lost but is connected with the first mobile terminal 1810 to be in use. Accordingly, the second mobile terminal 1820 does not delete, but maintains, the information on the mobile terminal auxiliary device 1850.

However, although not shown in the drawing, when the mobile terminal auxiliary device 1850 is not connected with even the first mobile terminal 1810, the second mobile terminal 1820 receives information stating that the mobile terminal auxiliary device 1850 is disconnected from all the mobile terminals from the server 1830. The second mobile terminal 1820 determines that the mobile terminal auxiliary device 1850 is lost. The second mobile terminal 1820 deletes the information on the mobile terminal auxiliary device 1850 and the security-related information. The first mobile terminal 1820 also deletes the information on the mobile terminal auxiliary device 1850 and the security-related information.

Figure 19:
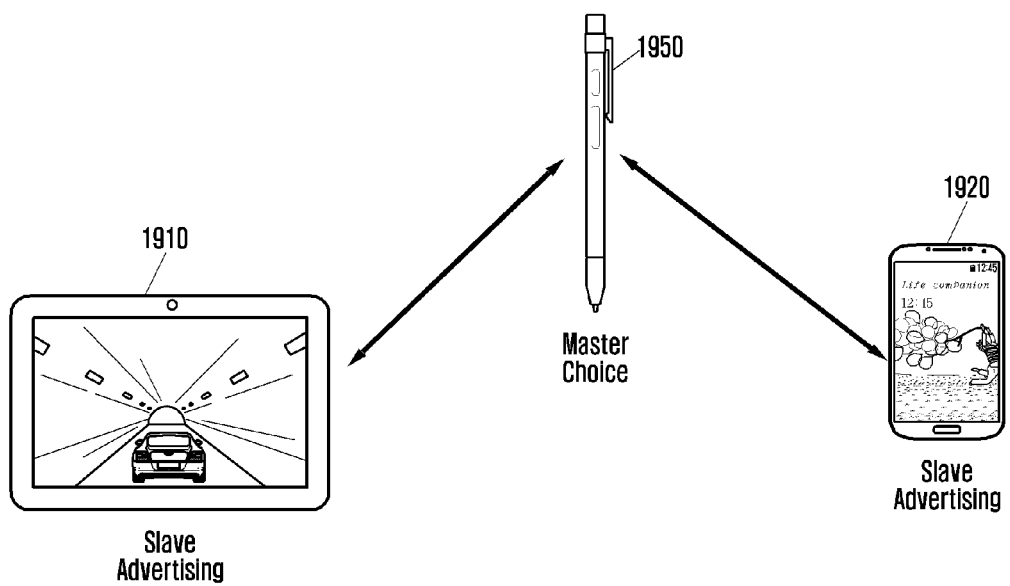
FIG. 19 is a diagram illustrating a method for managing a mobile terminal auxiliary device, according to another embodiment of the present invention.

FIG. 19 is a diagram illustrating a method for managing a mobile terminal auxiliary device, according to another embodiment of the present invention.

Referring to FIG. 19, a mobile terminal auxiliary device 1950 manages information on the registration thereof with respect to at least one mobile terminal 1910 or 1920.

The mobile terminal auxiliary device 1950 determines the connection state with the mobile terminals 1910 and 1920.

For example, the mobile terminal auxiliary device 1950 leaves the available distance area of the second mobile terminal 1920 while the mobile terminal auxiliary device 1950 is in use in connection with the second mobile terminal 1920. Afterward, the mobile terminal auxiliary device 1950 enters the available distance area of the first mobile terminal 1910 to be thereby connected with the first mobile terminal 1910 for use.

According to an embodiment of the present invention, the mobile terminal auxiliary device 1950 determines whether the mobile terminal auxiliary device 1950 is connected with the first mobile terminal 1910 within the predetermined disconnection time. That is, if the mobile terminal auxiliary device 1950 is disconnected from the second mobile terminal 1920, and is connected with the first mobile terminal 1910, the mobile terminal auxiliary device 1950 is not considered to be lost. Accordingly, the mobile terminal auxiliary device 1950 does not delete, but maintains, information on the mobile terminals 1910 and 1920 and the security-related information.

However, when the mobile terminal auxiliary device 1950 is not connected with even the first mobile terminal 1910, the mobile terminal auxiliary device 1950 is determined to be lost because it is not connected with any mobile terminal. The mobile terminal auxiliary device 1950 deletes the information on the mobile terminals 1910 and 1920, and the security-related information.

According to an embodiment of the present invention, when registering the mobile terminal auxiliary device in the mobile terminal, account information of applications, such as e-mails and SNS, may be stored in the memory of the mobile terminal auxiliary device. When using the mobile terminal by the mobile terminal auxiliary device, the mobile terminal auxiliary device may transmit the stored account information to the mobile terminal. The mobile terminal may automatically log on to the corresponding account without entering a password for logging-on according to the received account information.

Alternatively, according to an embodiment of the present invention, the mobile terminal auxiliary device stores information on releasing of the locked state of the mobile terminal. At this time, in the case of turning on the display unit of the mobile terminal by using a specific button of the mobile terminal auxiliary device, and touching the display unit of the mobile terminal by using the mobile terminal auxiliary device, the mobile terminal may be converted to the waiting mode without entering the password.

In addition, according to an embodiment of the present invention, the RSSI is continuously measured while the mobile terminal and the mobile terminal auxiliary device are in use, so that it may be determined whether the mobile terminal auxiliary device exists within the predetermined available distance. If the mobile terminal auxiliary device exists within the available distance as a result of the determination, the mobile terminal auxiliary device is determined to be in use, so that the display unit of the mobile terminal may be controlled to remain on.

According to an embodiment of the present invention, when making a payment by using the mobile terminal, the payment is easily approved when using the registered mobile terminal auxiliary device, or the payment is approved only when the security process, such as a signature, is conducted through the registered mobile terminal auxiliary device.

In addition, according to an embodiment of the present invention, specific objects displayed on the display unit of the mobile terminal are magnified or reduced by the input unit, such as buttons on the mobile terminal auxiliary device.

Also, according to an embodiment of the present invention, the described method may be embodied through a computer-readable code in a recording medium in which a program is recorded. The computer-readable medium includes all the types of recording devices in which data readable by a computer system are stored. The computer-readable recording medium may include ROMs, RAMs, CD-ROMs, magnetic tapes, floppy discs, optical data storages, or the like. The computer-readable recording medium may be implemented in the form of a carrier wave (e.g., transmission through the Internet). The computers may include the controller of the terminal or the controller of the mobile terminal auxiliary device.

It is obvious for those skilled in the art that various modifications can be made without departing from the scope and essential features of the present invention.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for controlling a mobile terminal auxiliary device, the method comprising:
   storing information on at least one mobile terminal and security-related information on each of the at least one mobile terminal;
   determining whether a mobile terminal exists within a predetermined available range from the mobile terminal auxiliary device based on an intensity of signals transmitted from the mobile terminal; and
   if the mobile terminal exists within the predetermined available range, releasing a locked state, which includes displaying a locked image, of the mobile terminal.

2. The method of claim 1, wherein determining whether the mobile terminal exists within the predetermined available range comprises:
   detecting a use signal of the mobile terminal auxiliary device; and
   determining whether the mobile terminal exists within the predetermined available range, when the use signal is detected.

3. The method of claim 2, wherein detecting the use signal comprises:
   detecting a touch signal of the mobile terminal auxiliary device;
   receiving, from the mobile terminal, touch time information on a detection time of the touch signal at the mobile terminal;
   comparing the received touch time information with a time when the touch signal of the mobile terminal auxiliary device is detected; and
   if the touch time information is identical to the time when the touch signal of the mobile terminal auxiliary device is detected, determining that the touch on the mobile terminal has been made by the mobile terminal auxiliary device.

4. The method of claim 2, wherein detecting the use signal comprises:
   detecting a touch signal of the mobile terminal auxiliary device;
   transmitting, to the mobile terminal, touch time information on a detection time of the touch signal of the mobile terminal auxiliary device; and
   receiving, from the mobile terminal, information on whether the mobile terminal auxiliary device has touched the mobile terminal.

5. The method of claim 1, further comprising:
   determining whether the mobile terminal exists within a predetermined connection range of the mobile terminal auxiliary device; and
   if the mobile terminal does not exist within the predetermined connection range, deleting information on the mobile terminal.

6. A method for controlling a mobile terminal, the method comprising:
   storing information on at least one mobile terminal auxiliary device;
   determining whether a mobile terminal auxiliary device exists within a predetermined available range from the mobile terminal based on an intensity of signals transmitted from the mobile terminal auxiliary device; and
   if the mobile terminal auxiliary device exists within the predetermined available range, releasing a locked state, which includes displaying a locked image, of the mobile device.

7. The method of claim 6, wherein determining whether the mobile terminal auxiliary device exists within the predetermined available range comprises:
   detecting a use signal of the mobile terminal auxiliary device; and
   determining whether the mobile terminal auxiliary device exists within the predetermined available range, when the use signal is detected.

8. The method of claim 7, wherein detecting the use signal comprises:
   detecting a touch signal of the mobile terminal;
   receiving, from the mobile terminal auxiliary device, touch time information on a detection time of the touch signal of the mobile terminal auxiliary device;
   comparing the received touch time information with a time when the touch signal of the mobile terminal is detected; and
   if the touch time information is identical to the time when the touch signal of the mobile terminal is detected, determining that the touch on the mobile terminal has been made by the mobile terminal auxiliary device.

9. The method of claim 7, wherein detecting the use signal comprises:
   detecting a touch signal of the mobile terminal;
   transmitting, to the mobile terminal auxiliary device, touch time information on a detection time of the touch signal of the mobile terminal; and
   receiving, from the mobile terminal auxiliary device, information on whether the mobile terminal auxiliary device has touched the mobile terminal.

10. The method of claim 6, further comprising:
    determining whether the mobile terminal auxiliary device exists within a predetermined connection range of the mobile terminal; and
    if the mobile terminal auxiliary device does not exist within the predetermined connection range, deleting information on the mobile terminal auxiliary device.

11. A mobile terminal auxiliary device comprising:
    a communication unit that communicates with at least one mobile terminal;
    a memory that stores information on the at least one mobile terminal and security-related information on each of the at least one mobile terminal; and
    a controller that determines whether a mobile terminal exists within a predetermined available range from the mobile terminal auxiliary device based on an intensity of signals transmitted from the mobile terminal, and releases a locked state, which includes displaying a locked image, of the mobile terminal if the mobile terminal exists within the predetermined available range.

12. The device of claim 11, wherein the controller controls to detect a use signal of the mobile terminal auxiliary device, and determine whether the mobile terminal exists within the predetermined available range, when the use signal is detected.

13. The device of claim 12, wherein the controller controls to detect a touch signal of the mobile terminal auxiliary device, receive, from the mobile terminal, touch time information on a detection time of the touch signal at the mobile terminal, compare the received touch time information with a time when the touch signal of the mobile terminal auxiliary device is detected, and if the touch time information is identical to the time when the touch signal of the mobile terminal auxiliary device is detected, determine that the touch on the mobile terminal has been made by the mobile terminal auxiliary device.

14. The device of claim 12, wherein the controller controls to detect a touch signal of the mobile terminal auxiliary device, transmit, to the mobile terminal, touch time information on a detection time of the touch signal of the mobile terminal auxiliary device, and receive, from the mobile terminal, information on whether the mobile terminal auxiliary device has touched the mobile terminal.

15. The device of claim 11, wherein the controller controls to determine whether the mobile terminal exists within a predetermined connection range of the mobile terminal auxiliary device, and if the mobile terminal does not exist within the predetermined connection range, delete information on the mobile terminal.

16. A mobile terminal comprising:
a communication unit that communicates with at least one mobile terminal auxiliary device;
a memory that stores information on the at least one mobile terminal auxiliary device; and
a controller that determines whether a mobile terminal auxiliary device exists within a predetermined available range from the mobile terminal based on an intensity of signals transmitted from the mobile terminal auxiliary device, and releases a locked state, which includes displaying a locked image, of the mobile terminal if the mobile terminal auxiliary device exists within the predetermined available range.

17. The mobile terminal of claim 16, wherein the controller controls to detect a use signal of the mobile terminal auxiliary device, and determine whether the mobile terminal auxiliary device exists within the predetermined available range when the use signal is detected.

18. The mobile terminal of claim 17, wherein the controller controls to detect a touch signal of the mobile terminal, receive, from the mobile terminal auxiliary device, touch time information on a detection time of the touch signal of the mobile terminal auxiliary device, compare the received touch time information with a time when the touch signal of the mobile terminal is detected, and if the touch time information is identical to the time when the touch signal of the mobile terminal is detected, determine that the touch on the mobile terminal has been made by the mobile terminal auxiliary device.

19. The mobile terminal of claim 17, wherein the controller controls to detect a touch signal of the mobile terminal, transmit, to the mobile terminal auxiliary device, touch time information on a detection time of the touch signal of the mobile terminal, and receive, from the mobile terminal auxiliary device, information on whether the mobile terminal auxiliary device has touched the mobile terminal.

20. The mobile terminal of claim 16, wherein the controller determines whether the mobile terminal auxiliary device exists within a predetermined connection range of the mobile terminal, and if the mobile terminal auxiliary device does not exist within the predetermined connection range, controls to delete information on the mobile terminal auxiliary device.

* * * * *